(12) United States Patent
Zavitz et al.

(10) Patent No.: US 10,138,648 B2
(45) Date of Patent: Nov. 27, 2018

(54) TOWER AND METHOD FOR ASSEMBLING TOWER

(71) Applicant: Tindall Corporation, Spartanburg, SC (US)

(72) Inventors: Bryant A. Zavitz, Dunwoody, GA (US); William Lowndes, III, Spartanburg, SC (US); Kevin Kirkley, Atlanta, GA (US)

(73) Assignee: Tindall Corporation, Spartanburg, SC (US)

( * ) Notice: Subject to any disclaimer, the term of this patent is extended or adjusted under 35 U.S.C. 154(b) by 0 days.

(21) Appl. No.: 14/992,297

(22) Filed: Jan. 11, 2016

(65) Prior Publication Data

US 2016/0201350 A1 Jul. 14, 2016

Related U.S. Application Data

(60) Provisional application No. 62/101,617, filed on Jan. 9, 2015.

(51) Int. Cl.
| | |
|---|---|
| *E04H 12/34* | (2006.01) |
| *F03D 13/20* | (2016.01) |
| *E02D 27/42* | (2006.01) |
| *E04H 12/16* | (2006.01) |
| *E04H 12/08* | (2006.01) |

(52) U.S. Cl.
CPC ......... *E04H 12/342* (2013.01); *E02D 27/425* (2013.01); *E04H 12/16* (2013.01); *F03D 13/20* (2016.05); *F03D 13/22* (2016.05); *E04H 12/08* (2013.01); *F05B 2240/912* (2013.01); *Y02E 10/728* (2013.01)

(58) Field of Classification Search
CPC ....... E04H 12/12; E04H 12/16; E04H 12/342; F03D 13/20; F03D 13/22; E02D 27/425; F05B 2240/912; Y10S 416/06; E04B 1/20; E04B 1/21; E04B 1/22
USPC .............................................. 52/223.4, 223.5
See application file for complete search history.

(56) References Cited

U.S. PATENT DOCUMENTS

| | | |
|---|---|---|
| 273,742 A | 3/1883 | Kent |
| 1,001,273 A | 8/1911 | Ingraham |

(Continued)

FOREIGN PATENT DOCUMENTS

| | | | |
|---|---|---|---|
| DE | 10 2012 001 109 A1 | * | 7/2013 |
| DE | 10 2014 118 251 A1 | * | 6/2016 |

(Continued)

OTHER PUBLICATIONS

Schokker et al. Simulated Field Testing of High Performance Grouts for Post-Tensioning. Journal of Bridge Engineering. Mar. 2002. vol. 7, Issue 2. pp. 1-3.

(Continued)

*Primary Examiner* — Robert Canfield
(74) *Attorney, Agent, or Firm* — Meunier Carlin & Curfman LLC

(57) ABSTRACT

The present invention broadly comprises a tower and a method and apparatus for constructing a tower, where one embodiment of apparatus includes a foundation, a plurality of lower staves located on the foundation, and a plurality of upper staves located above the lower staves, the upper staves having a poured in place concrete or grout joint between each adjacent upper stave.

13 Claims, 28 Drawing Sheets

(56) References Cited

U.S. PATENT DOCUMENTS

| | | | |
|---|---|---|---|
| 1,050,130 A * | 1/1913 | Harvey | E04B 5/023 52/193 |
| 1,054,085 A | 2/1913 | Brauchla | |
| 1,077,949 A | 11/1913 | Anderson | |
| 1,180,058 A | 4/1916 | McNutt | |
| 1,497,141 A * | 6/1924 | Hart | E04H 7/28 52/223.3 |
| 1,898,380 A | 2/1933 | Meier | |
| 2,074,592 A | 3/1937 | Rowell | |
| 2,120,838 A | 6/1938 | Lawrence | |
| 2,275,523 A | 3/1942 | Goldbeck | |
| 3,640,038 A | 2/1972 | Heron | |
| 3,695,044 A | 10/1972 | Hoshino | |
| 3,709,345 A | 1/1973 | Price | |
| 4,015,383 A | 4/1977 | Crowley | |
| 4,075,801 A | 2/1978 | Alper | |
| 4,078,354 A | 3/1978 | Crowley | |
| 4,118,909 A | 10/1978 | Rutten | |
| 4,122,640 A | 10/1978 | Commins et al. | |
| 4,126,976 A | 11/1978 | Crowley | |
| 4,187,660 A | 2/1980 | Lin et al. | |
| 4,249,352 A | 2/1981 | Marchaj | |
| 4,437,279 A | 3/1984 | Macaleese | |
| 4,454,693 A | 6/1984 | Price | |
| 4,545,701 A | 10/1985 | Tsuzuki | |
| 4,588,443 A | 5/1986 | Bache | |
| 4,751,804 A * | 6/1988 | Cazaly | E04H 12/12 52/245 |
| 4,886,550 A | 12/1989 | Alexander | |
| 4,965,970 A | 10/1990 | Nania | |
| 5,038,540 A * | 8/1991 | Krautz | E04H 12/28 52/245 |
| 5,134,828 A * | 8/1992 | Baur | E04B 1/043 52/699 |
| 5,265,750 A | 11/1993 | Whiteley et al. | |
| 6,167,912 B1 | 1/2001 | Stephens | |
| 6,247,279 B1 | 6/2001 | Murat | |
| 6,318,034 B1 * | 11/2001 | Zavitz | E03B 11/12 52/194 |
| 7,160,085 B2 | 1/2007 | De Roest | |
| 7,165,578 B2 | 1/2007 | Kamiyama | |
| 7,765,766 B2 * | 8/2010 | Gomez | E04H 12/12 52/742.16 |
| 8,272,173 B2 * | 9/2012 | Jakubowski | E02D 27/42 52/223.1 |
| 8,322,093 B2 * | 12/2012 | Zavitz | E04H 12/12 405/250 |
| 2006/0156681 A1 | 7/2006 | Fernandez Gomez et al. | |
| 2008/0209842 A1 * | 9/2008 | Montaner Fraguet | E04H 12/12 52/651.07 |
| 2009/0031639 A1 * | 2/2009 | Cortinacordero | E04H 12/12 52/40 |
| 2009/0307998 A1 | 12/2009 | Zavitz et al. | |
| 2009/0308019 A1 | 12/2009 | Knox et al. | |
| 2010/0139181 A1 | 6/2010 | Cortina/Cordero et al. | |
| 2010/0325986 A1 * | 12/2010 | Garc A Maestre et al. | E04H 12/085 52/223.3 |
| 2012/0266552 A1 * | 10/2012 | Huynh Tong | E04H 12/16 52/223.4 |
| 2012/0311948 A1 * | 12/2012 | Hangel | B66C 1/66 52/295 |
| 2012/0317918 A1 | 12/2012 | Rasmussen | |
| 2013/0081350 A1 * | 4/2013 | Bogl | E04H 12/08 52/651.01 |
| 2013/0212963 A1 * | 8/2013 | Miks | E04C 5/122 52/223.4 |
| 2014/0150359 A1 * | 6/2014 | Werner | E04H 12/085 52/223.5 |
| 2014/0215930 A1 * | 8/2014 | Zavitz | E04H 12/16 52/40 |
| 2014/0318055 A1 * | 10/2014 | Martinez De Castaneda | E04H 12/085 52/223.5 |
| 2015/0167645 A1 * | 6/2015 | Jensen | E04H 12/16 416/244 R |
| 2015/0247335 A1 * | 9/2015 | Abad Huber | E04H 12/12 52/223.4 |
| 2016/0108600 A1 * | 4/2016 | Menzel | E02D 27/42 52/223.13 |
| 2016/0160491 A1 * | 6/2016 | Ladret | E04B 1/043 52/223.6 |
| 2016/0312431 A1 * | 10/2016 | Coordes | E04H 12/08 |

FOREIGN PATENT DOCUMENTS

| | | |
|---|---|---|
| EP | 2886751 A1 * | 6/2015 |
| GB | 1292452 A | 10/1972 |

OTHER PUBLICATIONS

International Search Report and Written Opinion issued in related PCT Application No. PCT/US2016/012833 dated Mar. 17, 2016.

European Supplemental Search Report, dated Aug. 13, 2018, in connection with EP Application No. 16735539.5.

* cited by examiner

TOWER AND METHOD FOR ASSEMBLING TOWER

CROSS REFERENCE TO RELATED APPLICATIONS

This application claims priority under 35 U.S.C. § 119(c) to U.S. Application No. 62/101,617, filed Jan. 9, 2015, the entire content of which us incorporated into the present application by reference.

FIELD OF THE INVENTION

The present invention relates to a tower and a method for constructing a tower.

BACKGROUND OF THE INVENTION

Wind turbines are increasing relied on for power generation that does not create pollutants. Wind turbines are generally more efficient when the turbine is above approximately 120 m from the surface of the earth. Steel towers have been used to support wind turbines, but steel can become costly above 60-70 m in height. Accordingly, an economical tower that can support a wind turbine 100-120 m or more in the air is desired.

SUMMARY OF THE INVENTION

The present invention broadly comprises a tower and a method and apparatus for constructing a tower. One embodiment of the invention may be implemented as an apparatus including a foundation, a plurality of lower staves located on the foundation, and a plurality of upper staves located above the lower staves, the upper staves having a poured in place concrete or grouted joint between each adjacent upper stave.

A method for constructing a lower may include placing a foundation; assembling a first set of staves into a first tower section on the foundation; assembling a second set of staves into a second tower section; and moving the second lower section onto the first tower section.

Another embodiment of the apparatus may include a foundation; a plurality of lower staves located on the foundation; and a plurality of upper staves located above the lower staves. The first upper stave may be connected to a first lower stave by a rod extending through a passage in each of the first upper stave and the first lower stave.

BRIEF DESCRIPTION OF THE DRAWINGS

A full and enabling disclosure of the present subject matter, including the best mode thereof, directed to one of ordinary skill in the art, in set forth in the specification, which makes reference to the appended figures, in which.

DETAILED DESCRIPTION OF THE PREFERRED EMBODIMENTS

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
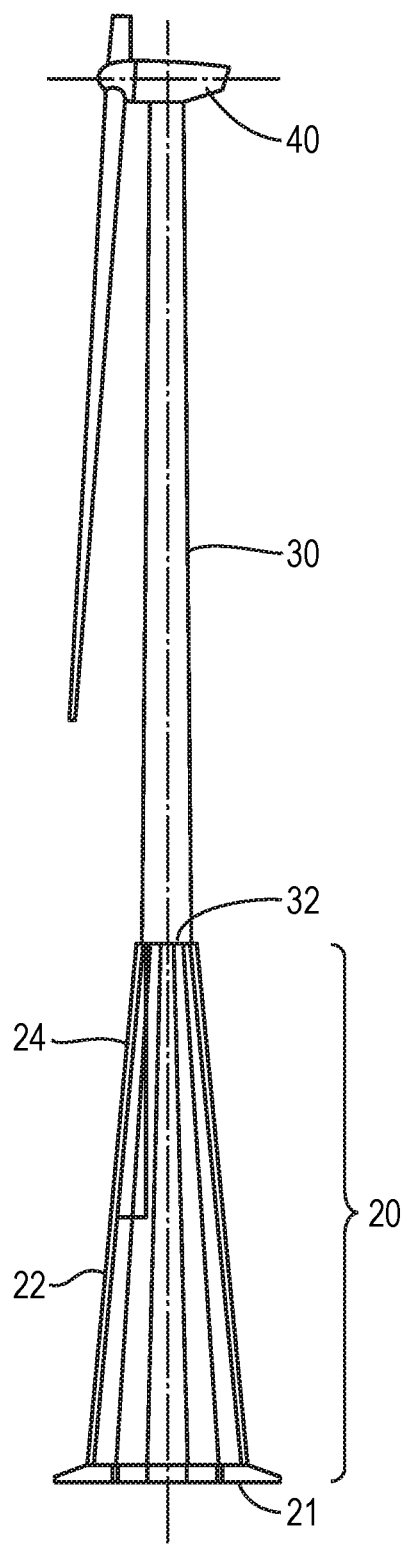
FIG. 1 illustrates a side view of an exemplary embodiment of the present invention.

FIG. 1 shows an exemplary embodiment of a tower 20 supporting steel tower 30, which supports wind turbine 40. Tower 20 includes a plurality of lower staves 22 and a plurality of upper staves 24. In the embodiments shown in FIGS. 1-11, there are 12 lower staves 22 and 12 upper staves 24. However, any number of upper and lower staves are within the scope of the invention. The lower staves 22 are mounted on foundation 21. The top of the upper staves is connected to steel tower 30 through steel adapter 32. Further, FIG. 1 shows tower 20 supporting turbine 40. However, tower 20 may be used to support any kind of machine or structure known in the art.

In this regard, FIG. 1 shows that the steel portion is roughly two thirds of the total height and tower 20 is roughly one third of the total height. However, other proportions are within the scope of the invention, including a tower 20 with no steel structure above.

Further, FIG. 1 shows a tower with two sets of staves, lower staves 22 and upper staves 24. However, the present invention includes towers having either one set of staves and more than two sets of staves, such as towers 20 including one, three, or four sets of staves. In these cases, each set of adjacent staves may be connected by the joint shown in FIG. 4, and the top of the staves are constructed as shown, in FIGS. 8 and 9.

Figure 2:
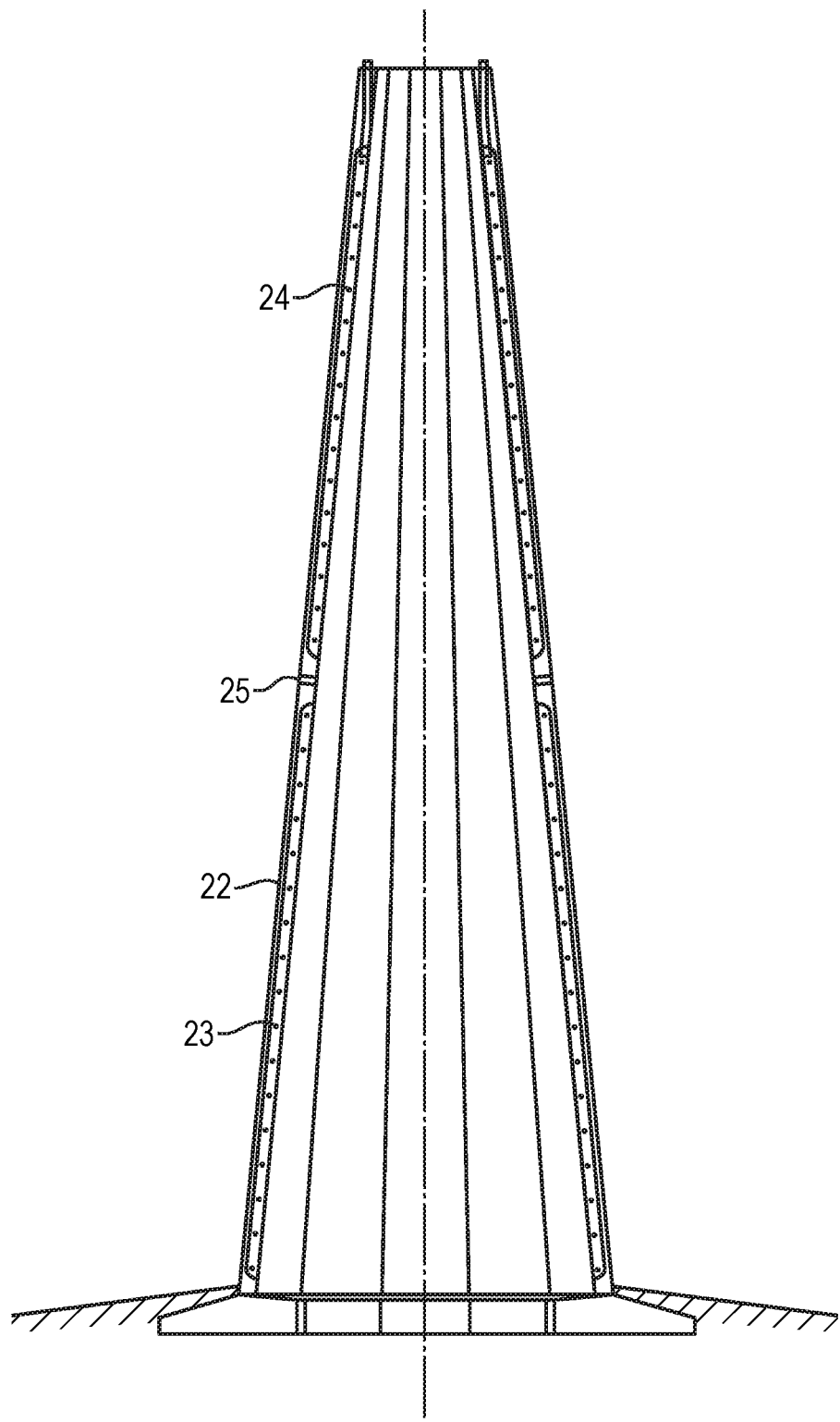
FIG. 2 illustrates a close up side view of an embodiment of the tower of the present invention.
Figure 6:
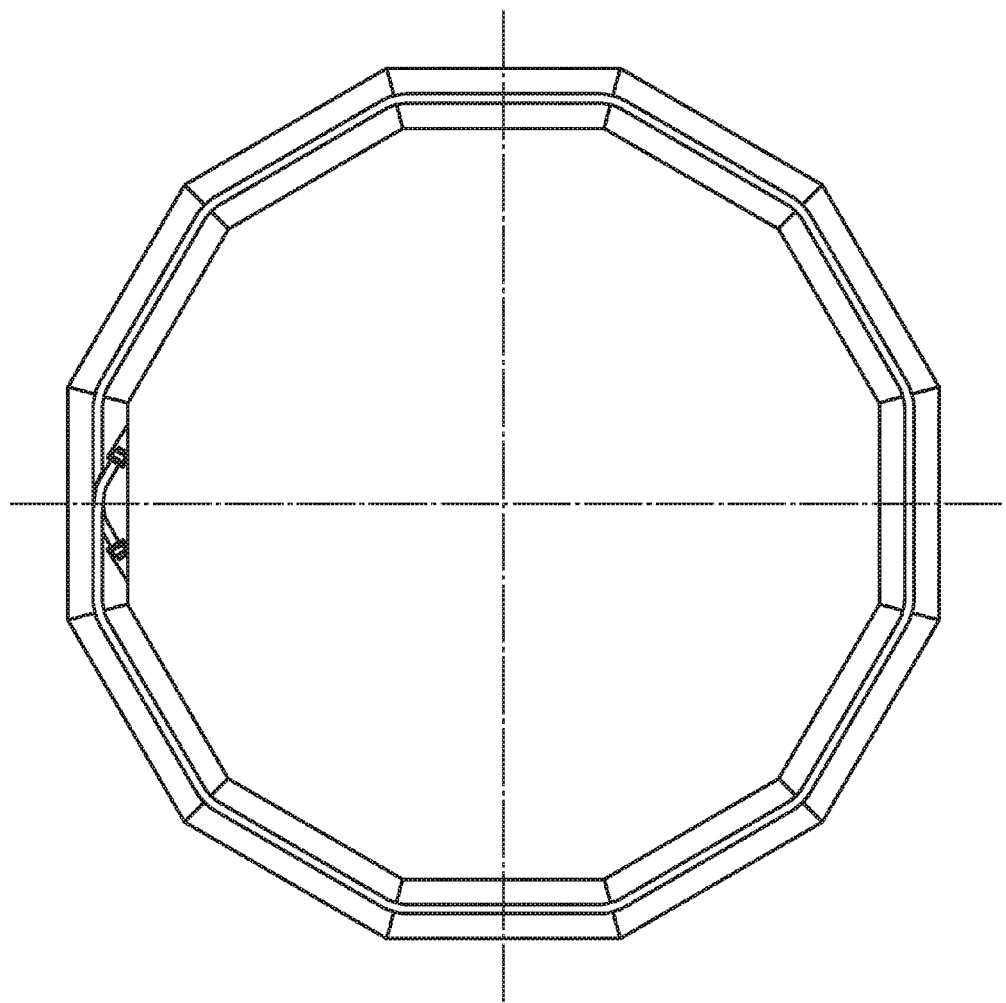
FIG. 6 illustrates a horizontal cross-sectional view of an embodiment of the tendon anchors of the present invention.
Figure 7:
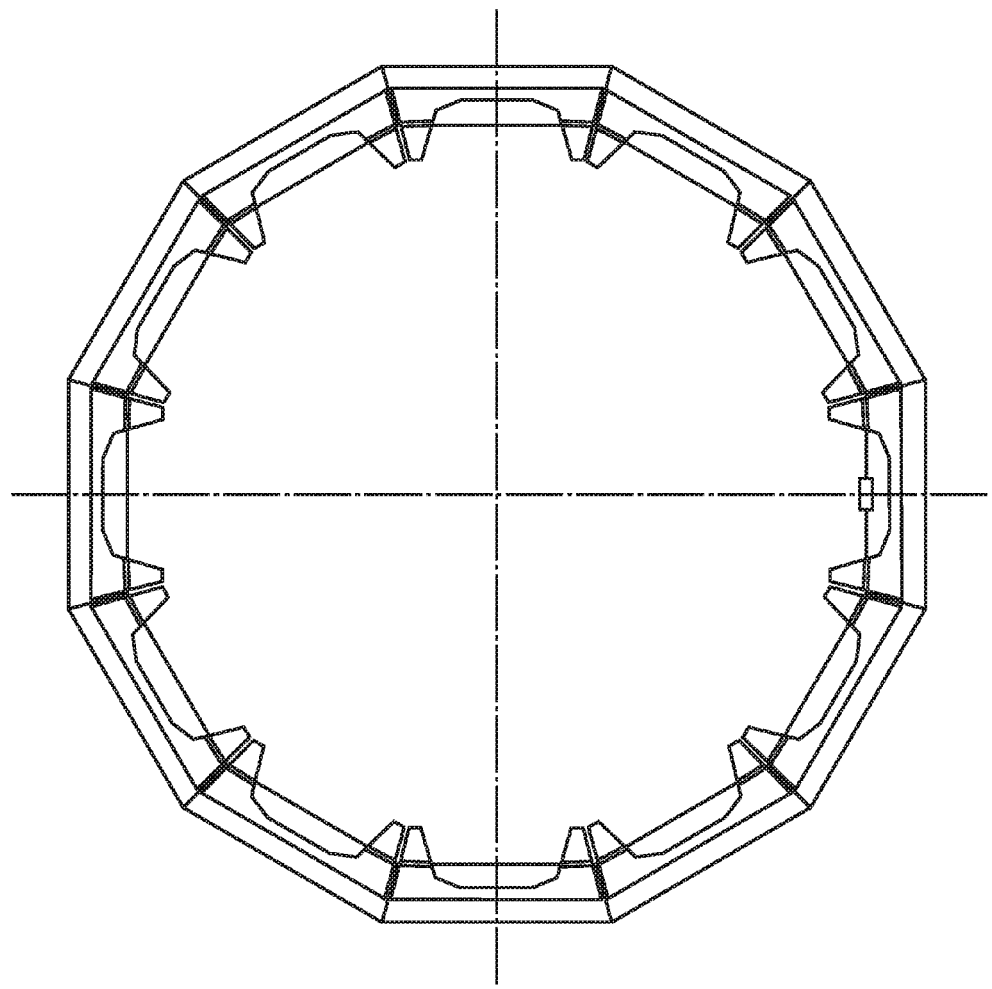
FIG. 7 illustrates a horizontal cross-sectional view of an embodiment of the monostrand tendons of the present invention.

FIGS. 2 and 7 show that the tower 20 may be held together in part by monostrand tendons 23 that pass through horizontal duels in each of the staves 22 or 24. These monostrand tendons 23 are then tensioned to provide force compressing the staves together. FIGS. 2 and 6 show tendons 25, which also pass through horizontal ducts in each stave and are tensioned to compress the staves together. In the exemplary, embodiments shown in FIGS. 1-11, there are two tendons 23 in each of two locations near the foundation 21, a plurality of single tendons 23 at intervals along the length of the lower staves 22, four tendons 25 near the joint between the lower staves 22 and the upper staves 24, a plurality of single tendons 23 along the length of the upper staves 24, double tendons 23 near the top of upper staves 24, and multiple sets of 4 tendons 25 at the top of upper staves 24. However, different configurations and numbers of tendons 23 and 25 are possible and within the scope of the invention.

In this regard, FIG. 6 shows plural tendons and FIG. 7 shows monostrand tendons. However, the configuration of FIG. 6 may be used with monostrand tendons and the configuration of FIG. 7 may be used with plural tendons, and these modifications are within the scope of the present invention.

Figure 3:
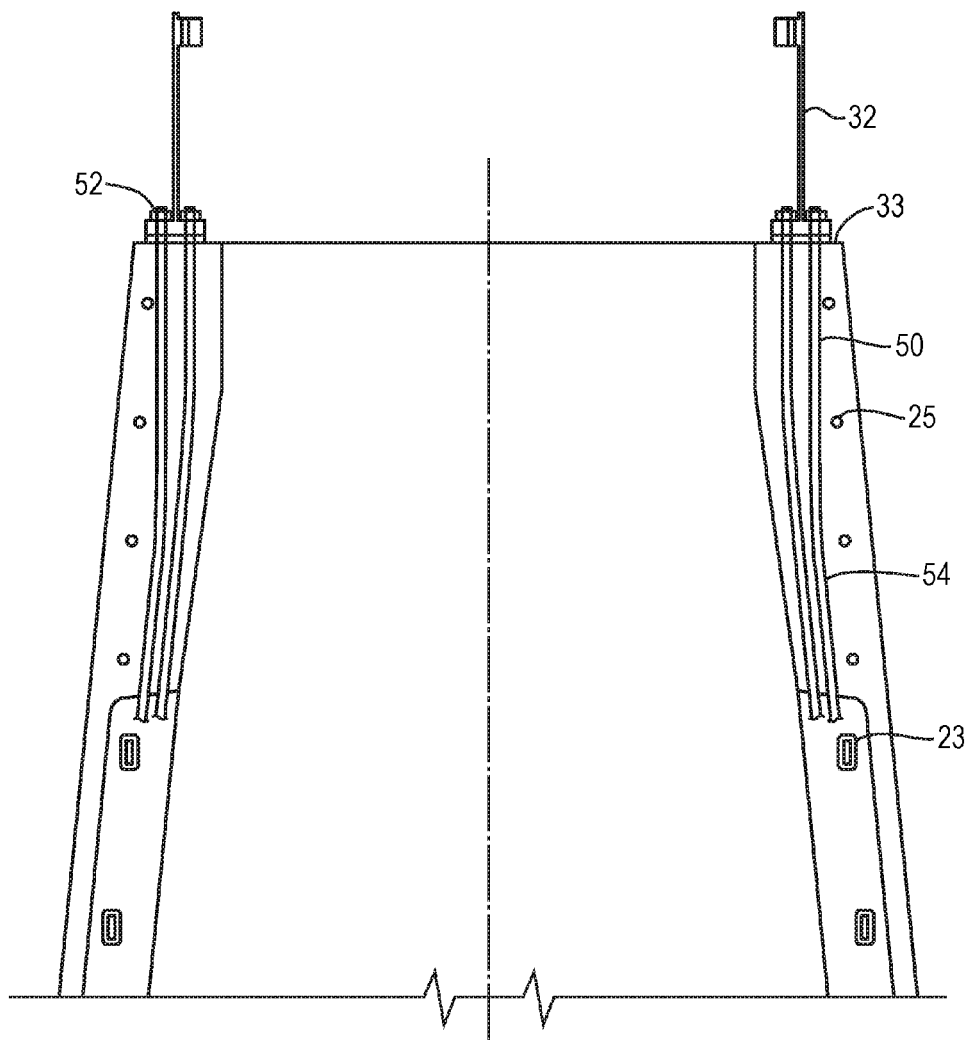
FIG. 3 illustrates a close up cross-sectional view of an embodiment of the top of the tower of the present invention.

FIG. 3 shows a close up vertical cross-section of the top of upper staves 24 and the adapter 32. Tower 20 also includes post tensioning tendons 50 that run through tendon ducts 54. In the embodiment shown in FIGS. 1-11, there are four tendon ducts running the length of each of upper staves 24. However, any number of tendon ducts could run the length of each of upper staves 24 and still be within the scope of the invention. In the lower staves 22, two of the ducts 54 run the length of the stave, and two run from the top of the lower stave to an endpoint near the top of the lower stave. Thus, half of the 48 tendons 50 run from the top of the upper staves to the foundation 21, and half run from the top of upper stave 24 to the endpoint just below the joint between the upper and lower staves. However, 25-100% of tendons 50 could run from the top of the upper staves to the foundation 21 (while 0-75% run from the top of upper stave 24 to the endpoint just below the joint between the upper and lower staves) and still be within the scope of the invention. Each tendon 50 passes through a hole in adapter 32 and is terminated by a nut or anchor 52. Thus, each tendon 50 serves to compress the joint between the respective upper and lower stave, and also to compress the adapter 32 to the top of the upper staves 24. A grouted joint 33 may also be located between the adapter 32 and the top of the upper staves 24.

Figure 4:
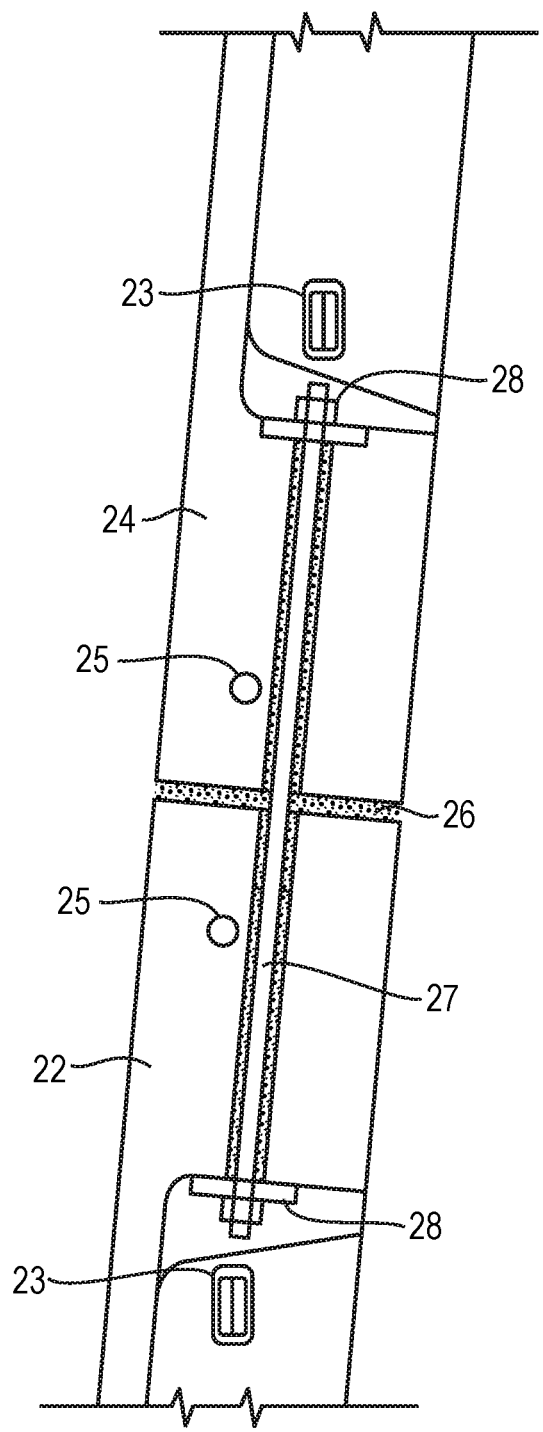
FIG. 4 illustrates a close up cross-sectional view of an embodiment of the joint between the lower and upper staves.

FIG. 4 shows the joint between the lower staves 22 and the upper staves 24. A layer of grout 26 may be used to fill and seal this joint. Further, rod 27 may run through a duct in each stave through the joint. Nuts 28 at each of rod 27 can provide further compressive force on the joint. Grout may also be used to fill empty volume around rod 27.

Figure 5:
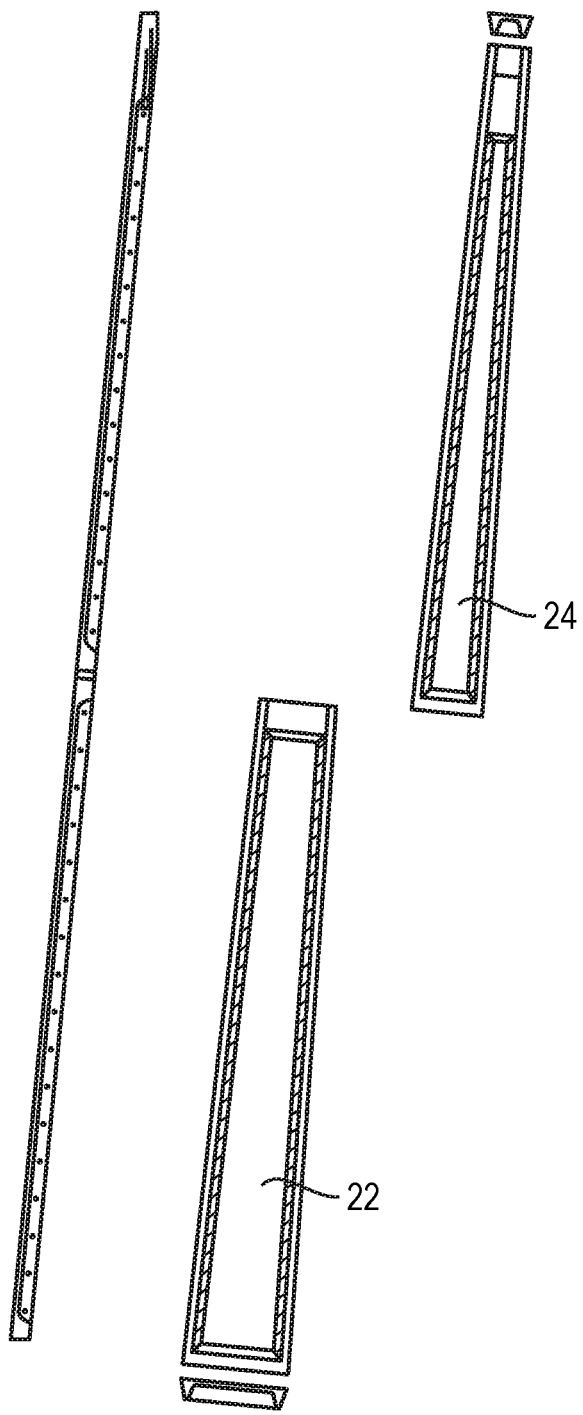
FIG. 5 illustrates exemplary lower and upper staves of the present invention.

FIG. 5 shows that, in one embodiment, the bottom of lower stave 22 is wider than the top of lower stave 22, which is wider than the bottom of upper stave 24, which is wider than the top of upper stave 24.

Figure 8:
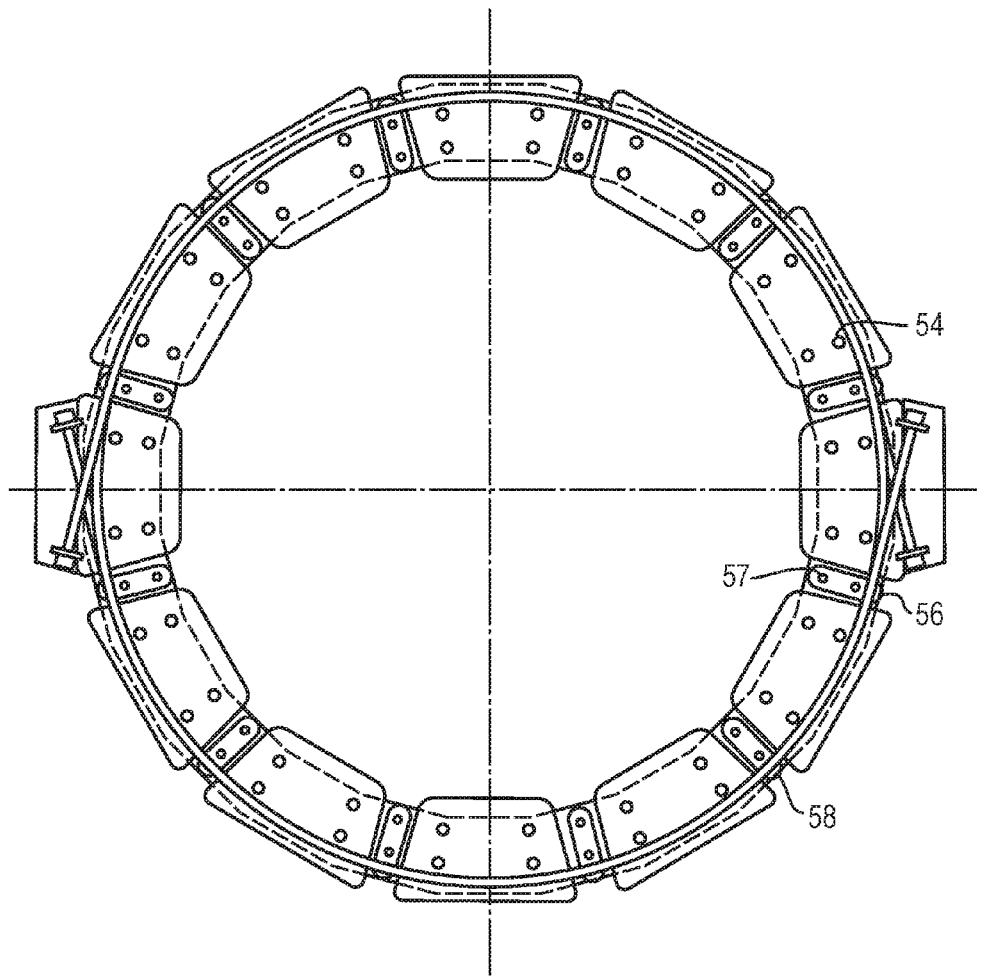
FIG. 8 illustrates a horizontal cross-sectional view near the top of an embodiment of the upper staves of the present invention.

FIG. 8 is a horizontal cross-section just below the tops of upper staves 24. FIG. 8 shows that in one embodiment the top portions of upper staves 24 are not in contact with each other. Instead, gaps 56 exist between the tops of the staves 24. These gaps 56 may extend 3 m from the tops of upper staves 24 in one embodiment. Rebar 58 extends from inside of the tops of each stave 24 and runs horizontally towards the adjacent stave 24. Further, vertical rebar 57 may run from the bottom of gap 56 to the top of the gap 56. In one embodiment, gaps 56 are filled with poured concrete that envelops rebars 57 and 58 to form a field concrete joint in each gap 56.

By pouring concrete into gaps 56 to form a field concrete joint in each gap 56, the top of the upper staves 24 can be transitioned from a conical horizontal cross-section to a cylindrical horizontal cross-section. This provides better support to the steel tower 30, and a better joint between adapter 32 and the top of tower 20.

Figure 9:
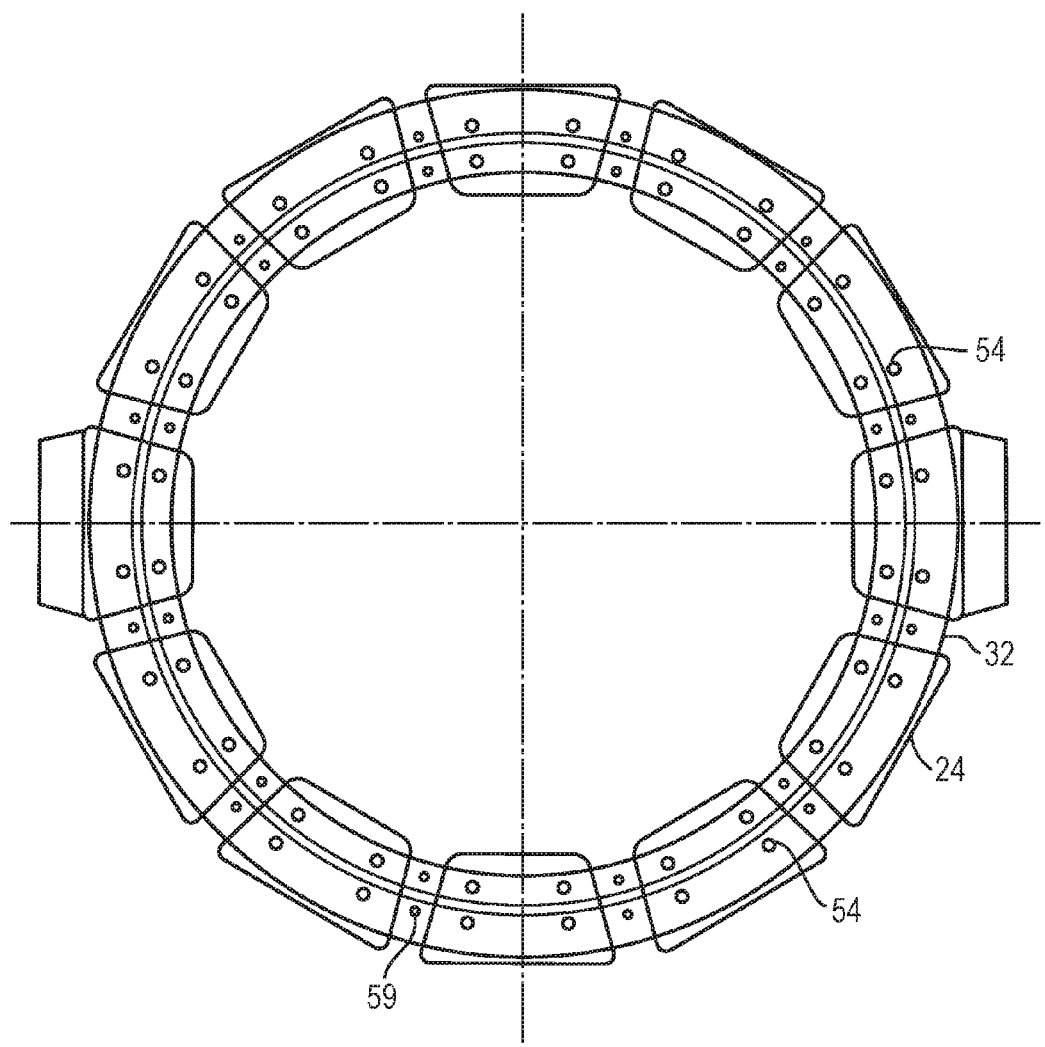
FIG. 9 illustrates a horizontal cross-sectional view of an embodiment of the steel adapter of the present invention.

FIG. 9 shows a top view of the adapter 32 on the top of the strives 24. Nuts or anchors 52 (shown in FIG. 3) which connect to the tendons 50 hold the adapter 32 to the top of staves 24. Also, vertical rebars 57 may pass through holes in adapter 32 and have fasteners 59 attached thereto. This can add additional compressive force to the joint between the adapter 32 and the tops of staves 24.

Figure 10:
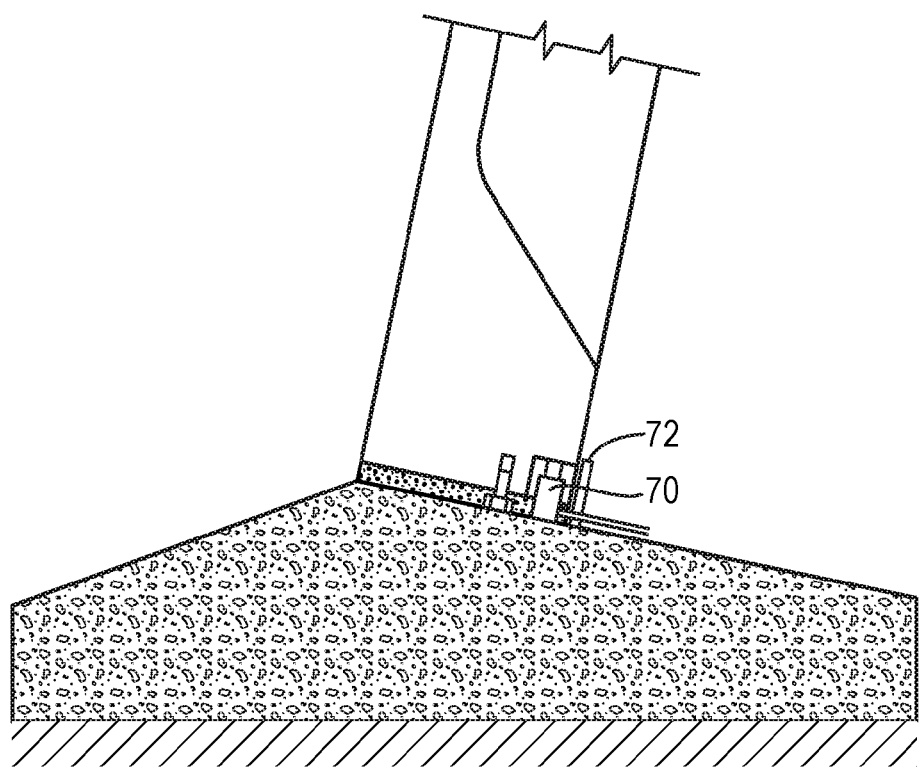
FIGS. 10 and 11 show an embodiment of a method to construct a tower according to the present invention.
Figure 11:
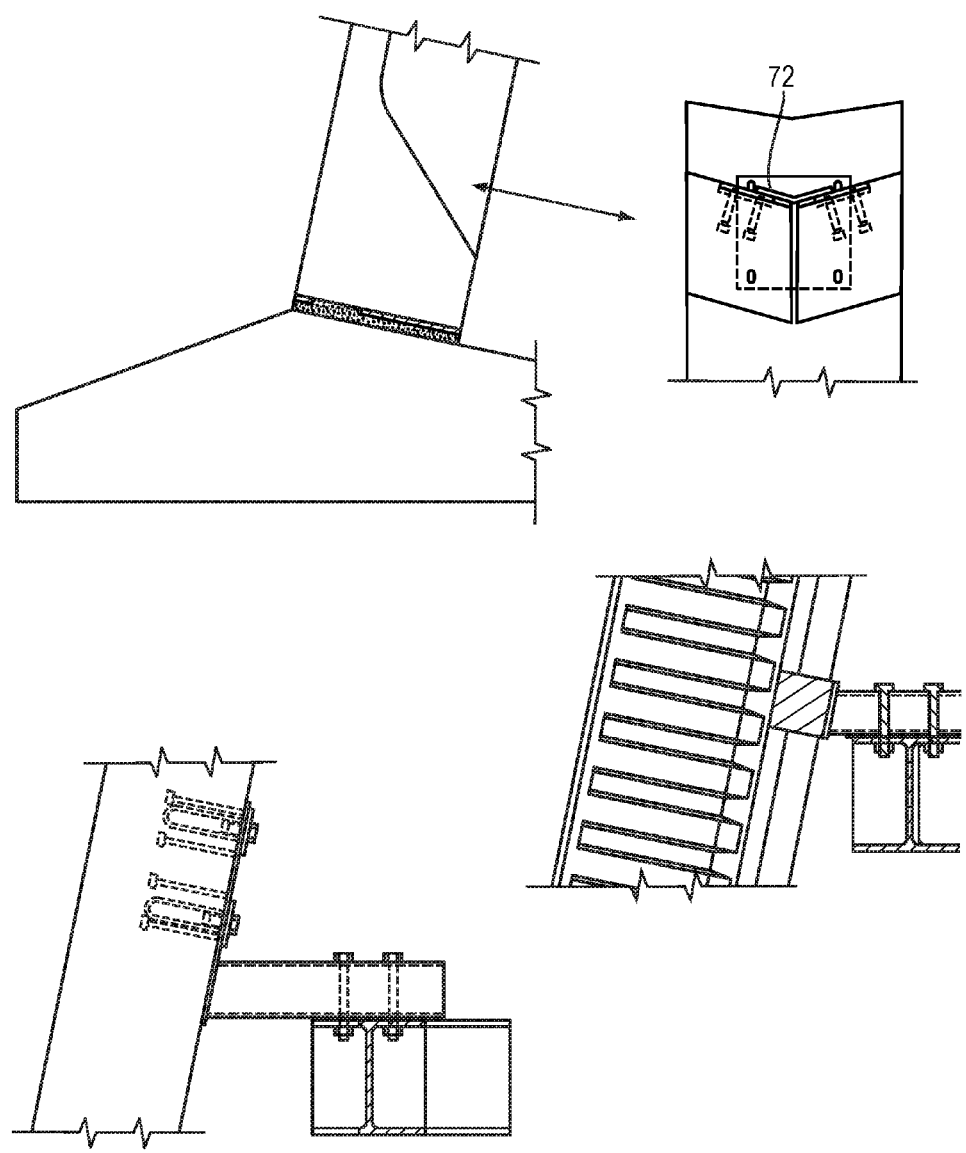

FIGS. 10 and 11 show an exemplary method of supporting and locating the lower staves 22. In one embodiment, the structure may be assembled as follows:

A) Survey and Layout
1) Survey foundation 21 and establish each stave node on the top of foundation 21.
2) Establish the tower centerline point on the temporary pole foundation as well as a benchmark for elevation control. Set the nuts on the temporary pole foundation to correct setting elevation.
3) Weld the node point embeds into position.

B) Erect Center Pole Support Tower (Lower Section Only)
1) Erect the Lower section on the anchor bolts and use three main braces to fine tune to plumb. Tighten the remaining three main braces to a snug condition.

C) Erect Lower Staves 22
1) Rig, lift and swing the first stave into position sitting it on the hydraulic jacks 70 shown in FIG. 10. Lower and rise as necessary to get the top of the stave between the bolting platform node plates and at the correct elevation. When set, place and tighten bolts at the top, run down the support bolts at the bottom, weld the stave corners to the node plates 72. (Crane can now slack the lines, unhook, and start on the next piece) The erection order must be followed.
2) Dam the lower foundation to stave joint and immediately plate use base grout on a stave by stave basis.
3) Erect lower staves 22, grouting the base connection as erection proceeds.

D) Erect Center Pole Support Tower (Upper Section)
1) Erect the Upper section on the anchor bolts in the lop of the tower section. Plumb and align the Upper section using three main braces. Tighten the remaining three braces to a snug condition.

E) Erect Upper Staves 24
1) Rig, lift and swing the first stave into position sitting it on the hydraulic jacks 70 previously used on the lower staves. Lower and rise as necessary to get the top of the stave between the top bolting platform node plates and at the correct elevation. When set, place and tighten bolts at the top, run down the support bolts at the bottom. (Crane can now slack the lines, unhook, and start on the next piece) The erection order must be followed. During this process circumferential P.T. tendons 23 and 25 may be placed and stave to stave joints between the lower staves may be grouted.

2) At completion of erection of the upper staves 24 joint work at elevation 23 m+− should commence. This includes placing circumferential P.T. tendons 23 and 25 from elevation 21 m to elevation 24 m and placing the 24-30 mm rods 27.

3) Immediately following 2 above the stave to stave joint from 21 m to 23 m and the horizontal stave to stave joint needs to be grouted. When this is done grout the 30 mm rods 27.

F) Erect Steel Adaptor 32

1) Place the steel adapter on shims to the correct vertical and horizontal alignment Check for tendon clearance for the tendons 50.

2) Place circumferential P.T. tendons 23 and 25 from elevation 43 m to 46 m.

3) Place reinforcement 57 in each stave to stave joints 56 (10"×60" each)

4) Form the inside and outside of the joints.

5) Pour each joint.

6) Stave to stave joints in the remainder of the upper staves can proceed concurrently with these activities.

7) Circumferential post tensioning 23 and 25 can proceed as well. Stave joint grout must be 3000+− psi at the level being stressed.

G) Remove Upper and Lower Center Pole Support Sections

1) This can happen either before or after "H"

H) Place and Stress Vertical Post Tension Tendons 50

I) Install Ladder and Tower Internals

Figure 12:
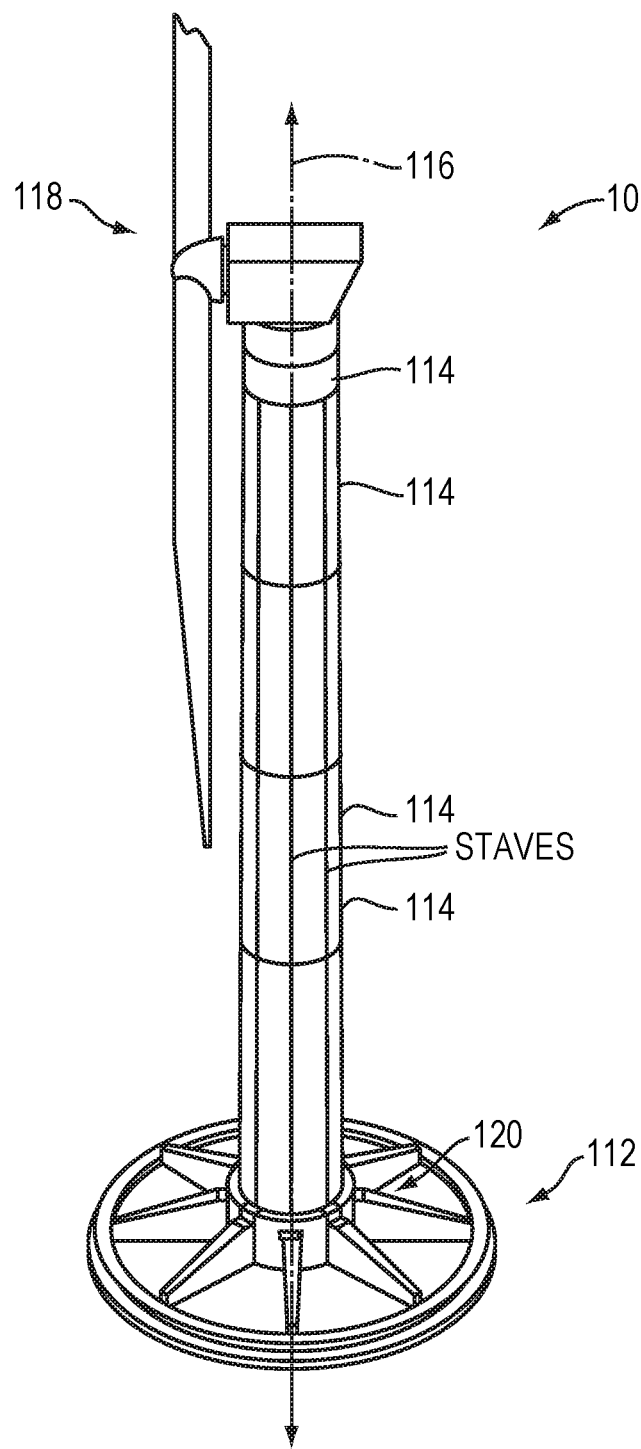
FIG. 12 illustrates an alternative embodiment of a tower as shown FIG. 1.

Further embodiments are shown in FIGS. 12-28. FIG. 12 shows an alternative embodiment of a tower 10 including ring foundation 112, core component assembly 120, tube elements 113, four sets of staves 114, centerline 116, and wind turbine 119. The core component assembly 120 may be the same as that disclosed in U.S. Pat. No. 9,175,493, which is incorporated by reference herein in its entirety. There may be grout at the horizontal joints between staves 114, as well as additional securements as discussed herein.

Figure 13:
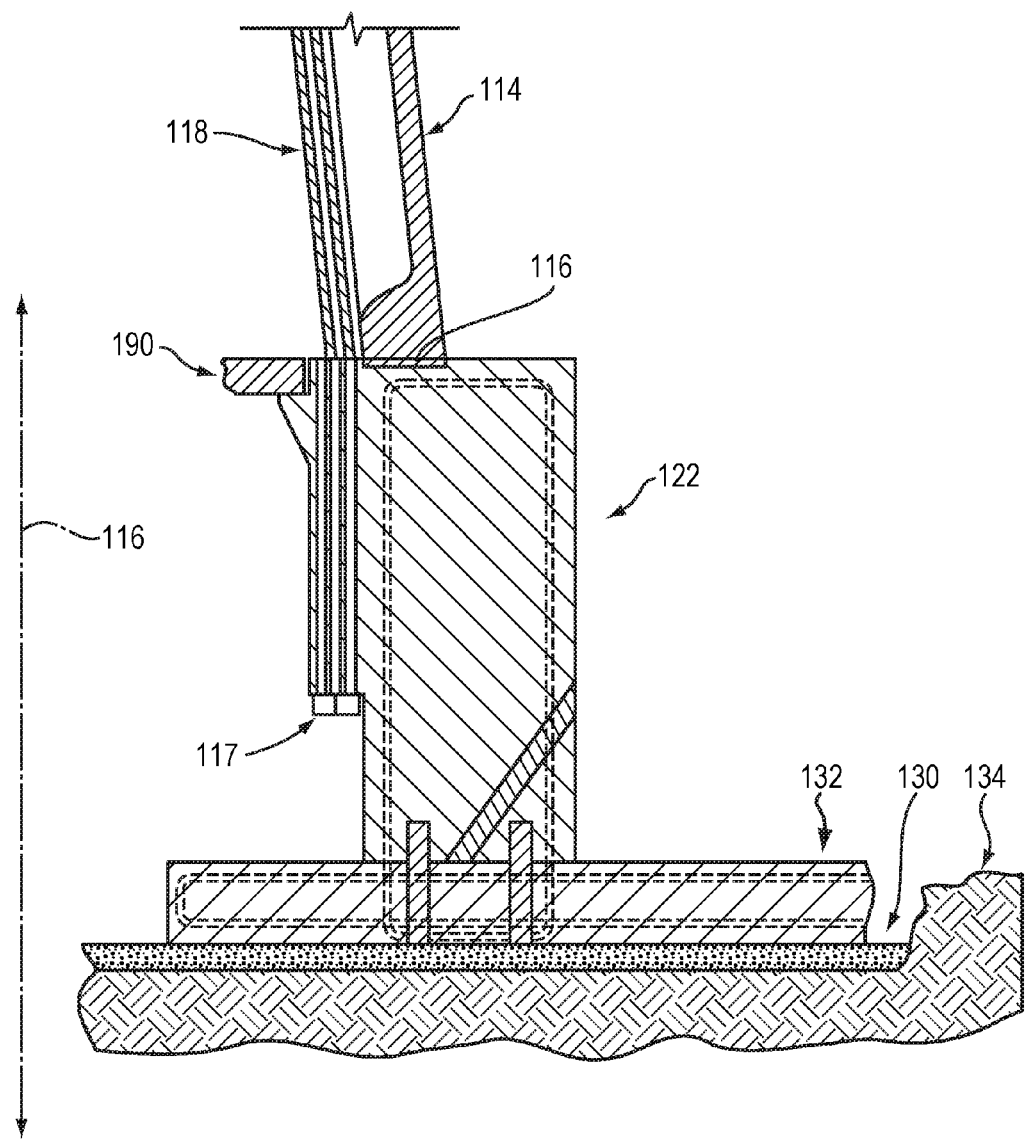
FIG. 13 illustrates a cutaway view of the core component assembly 120 shown in FIG. 12.

FIG. 13 shows a cutaway view of the core component assembly 120 assembled in ground 134. The assembly 120 may include mud slab 130, foundation 132, core component 122, work platform 190, and vertical post-tensioning tendons 118 that are capped at post-tensioning tendon anchors 117. Grout joint 116 is located between core component 122 and stave 114.

Figure 14:
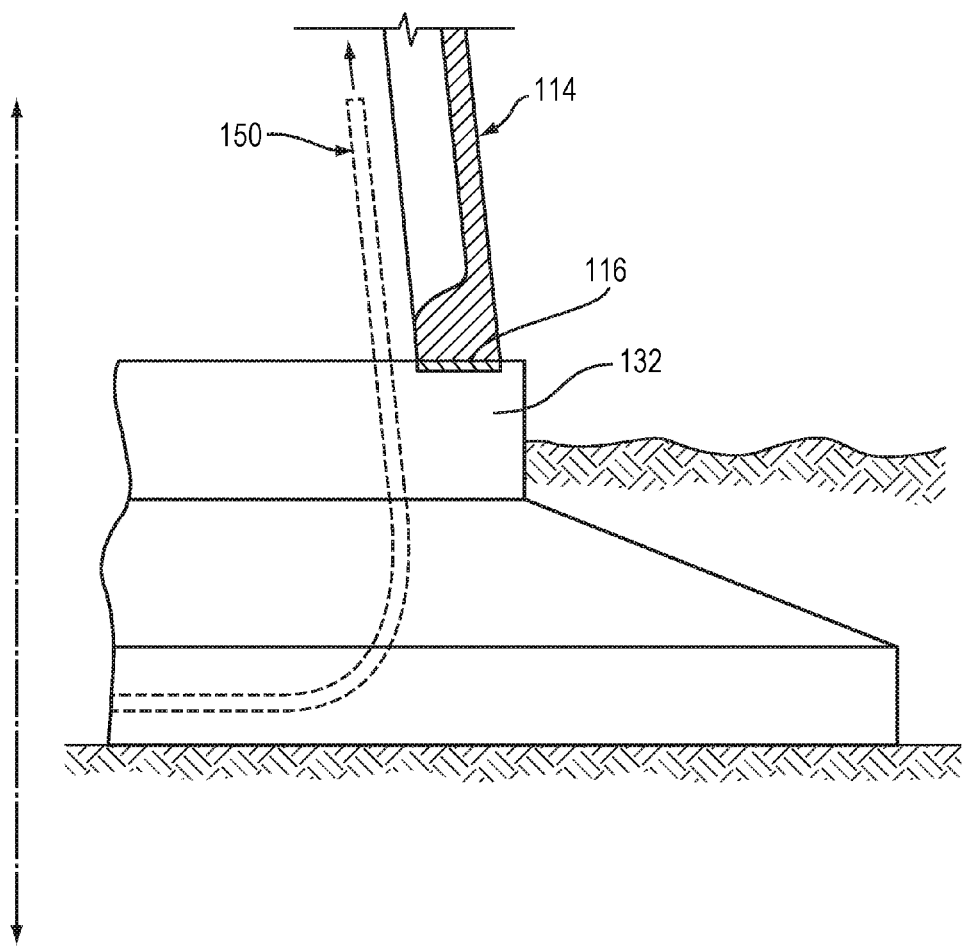
FIGS. 14, 15, and 18 illustrate alternative embodiments of foundations included in the present invention.

FIG. 14 shows an alternative embodiment including vertical tendon 150 that runs through the foundation 132. In this case, foundation 132 may be a disk or conventional foundation that is poured on site.

Figure 15:
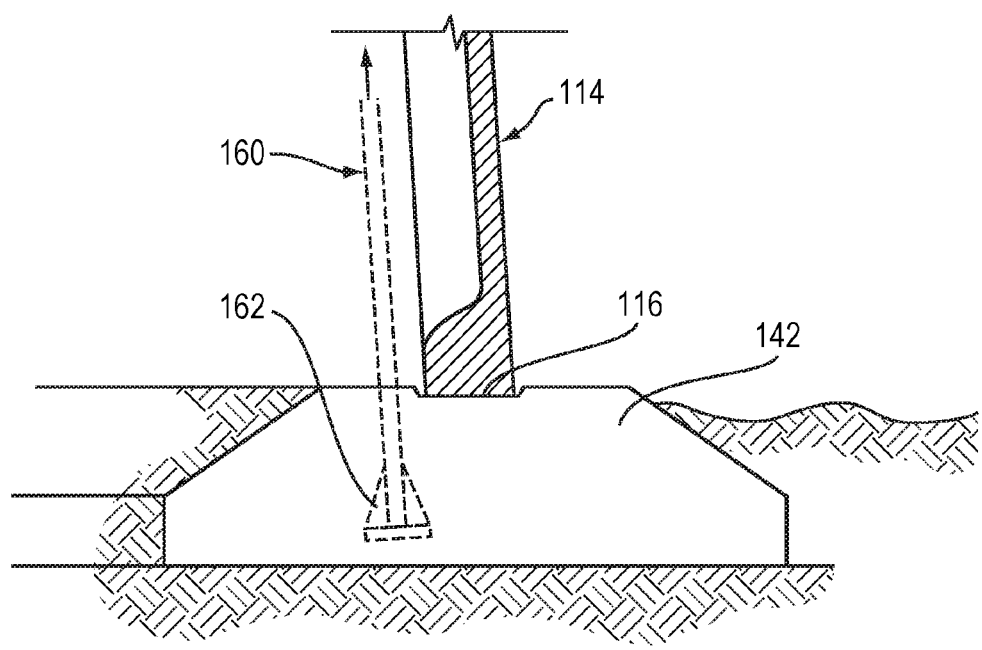

FIG. 15 shows an additional embodiment including a ring foundation 142 that is poured on site after tendon anchor 162 at the end of tendon 160 is located in the foundation 142.

Figure 16:
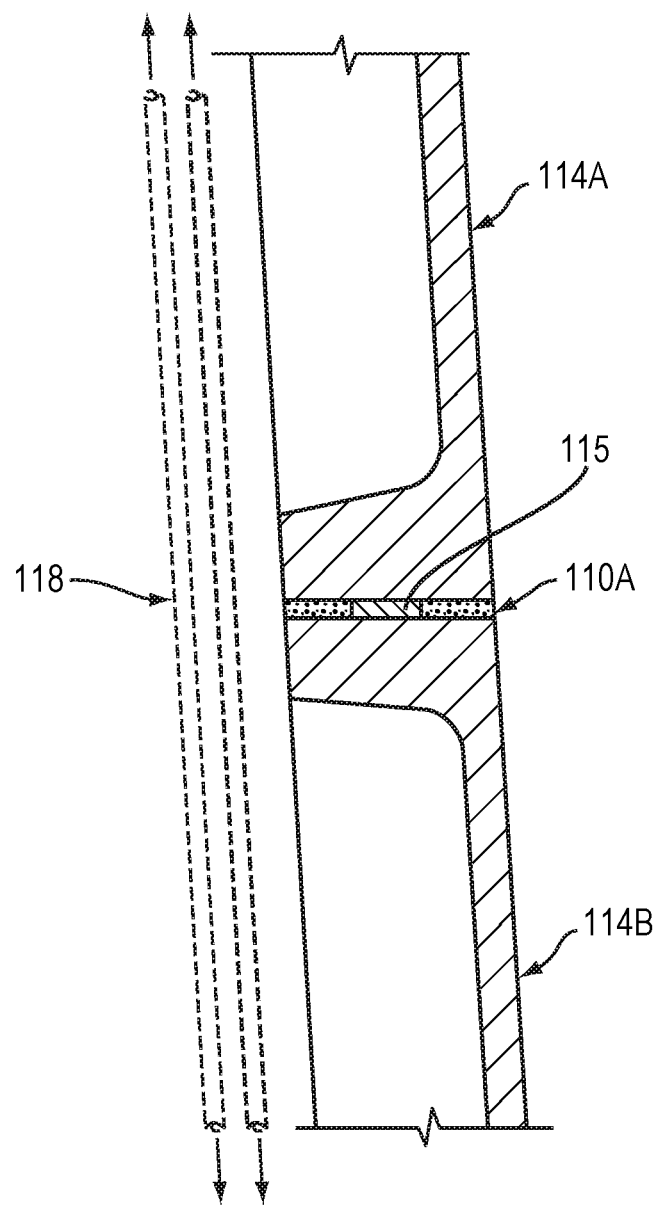
FIGS. 16 and 17 show side cross-sectional views of alternative embodiments of a horizontal joint between staves included in the present invention.

FIG. 16 illustrates an embodiment of a joint between two staves 114A and 114B. Post-tensioning tendons 118 run along an inner surface of the staves 114A and 114B. Shim 115 is put in place before grout 110A is added to fill and seal the joint between the staves.

Figure 17:
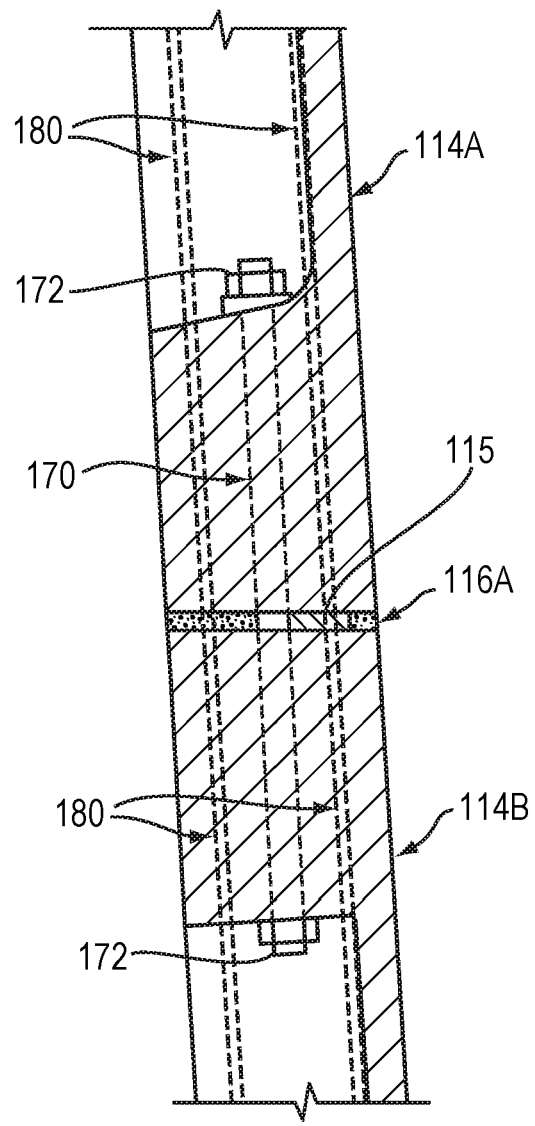

FIG. 17 illustrates an alternative embodiment of a joint between staves 114A and 114B. In this case, post-tension rod 170, capped on each end by nuts 172, runs through corresponding passages in each stave. Nuts 172 are tightened to clamp the staves together. Pre-stress tendons 180 are included in the pre-cast stave 114 and run the length of each stave. Thus, the load is borne by the pre-stress tendons 180 along the length of stave 114A, then the load is transferred to the pre-stress tendons 180 in stave 114B through post-tension rod 170. Shim 115 and grout 116A may also be used to secure the joint.

Figure 18:
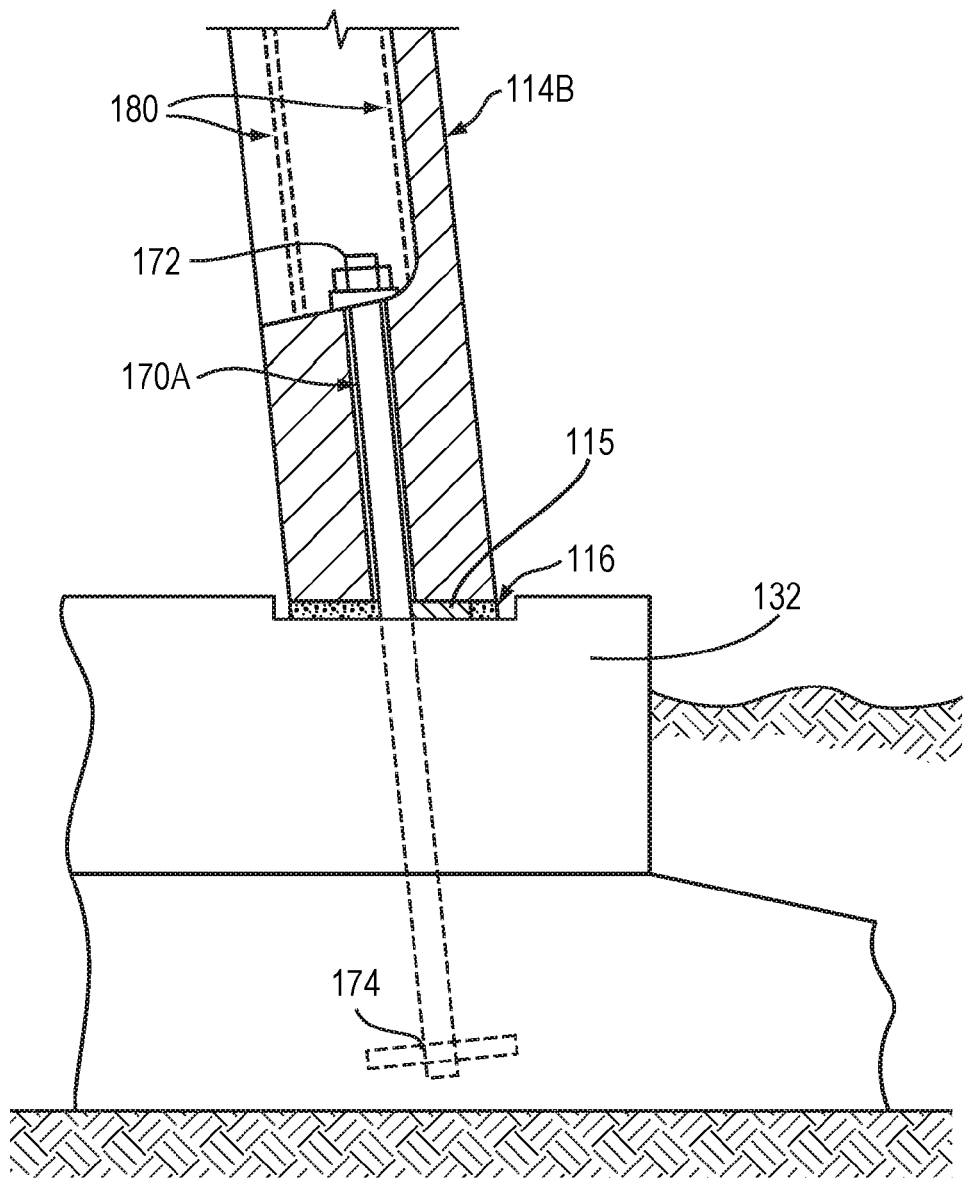

FIG. 18 shows an additional embodiment for securing the staves to the foundation. In this embodiment post tension rod 170A is partially cast into field poured disk or ring foundation 132. Slave 114B is then assembled onto the rod 170A, and nut 172 clamps stave 114B to foundation 132. Shims 115 and grout 116 may also be used to secure the joint.

Figure 19:
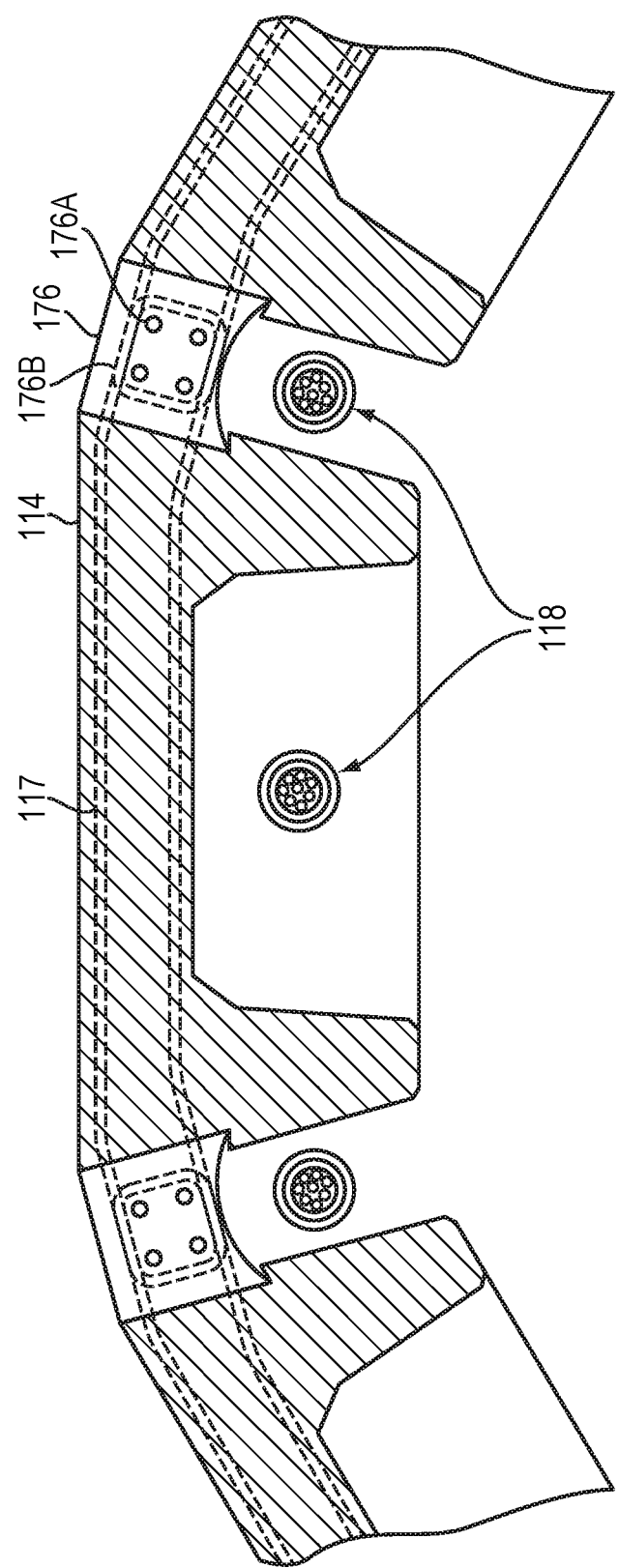
FIGS. 19, 20, and 25 illustrate alternative embodiments of a vertical joint between staves included in the present invention.

FIG. 19 shows an embodiment of a structure for securing the vertical edges of staves 114 in the adjacent stave edges. Initially, vertical reinforcement bars 176A are placed into the gaps between adjacent staves 114. (Reinforcement bars 176B are external portions of reinforcement bars 117 that are pre-cast into the staves and extend out of the vertical side edges of the staves into the gap between adjacent staves.) Then, concrete joint 176 is field poured around the reinforcement bars 176A and 176B to secure the vertical edges of the staves with respect to each other.

Figure 20:
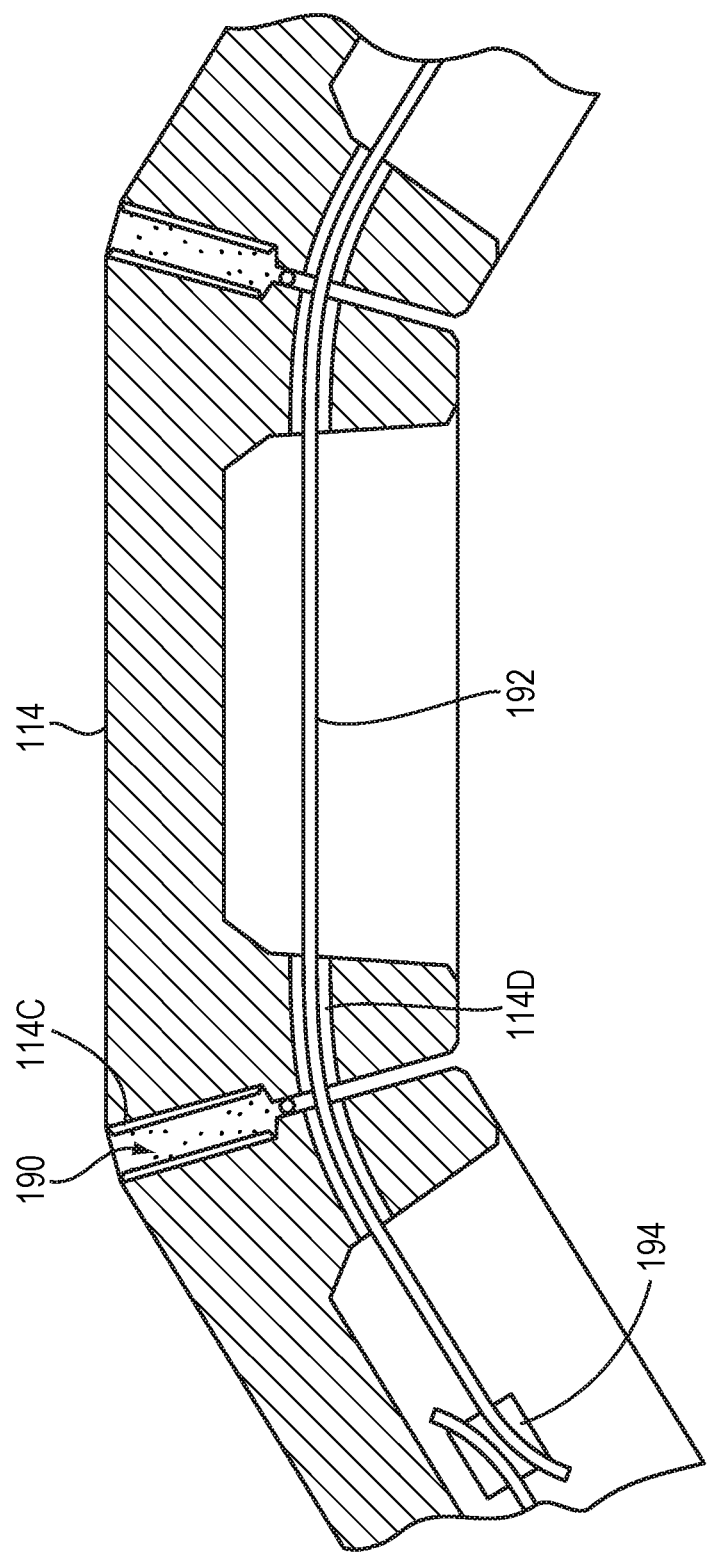

An alternative embodiment of a joint between vertical edges of the staves is shown in FIG. 20. Similar subject matter is also shown in U.S. patent application Ser. No. 14/172,166, which is incorporated by reference herein in its entirety. Staves 114 include channels 114D through which horizontal post-tensioning tendons 192 are run. Each stave 114 includes shear keys 114C in a channel filled with a filler material 190, which may be a thixotropic filler material. Cross over anchor 194 then secures the tensioned tendon 192 to clamp the staves 114 to each other.

Figure 21:
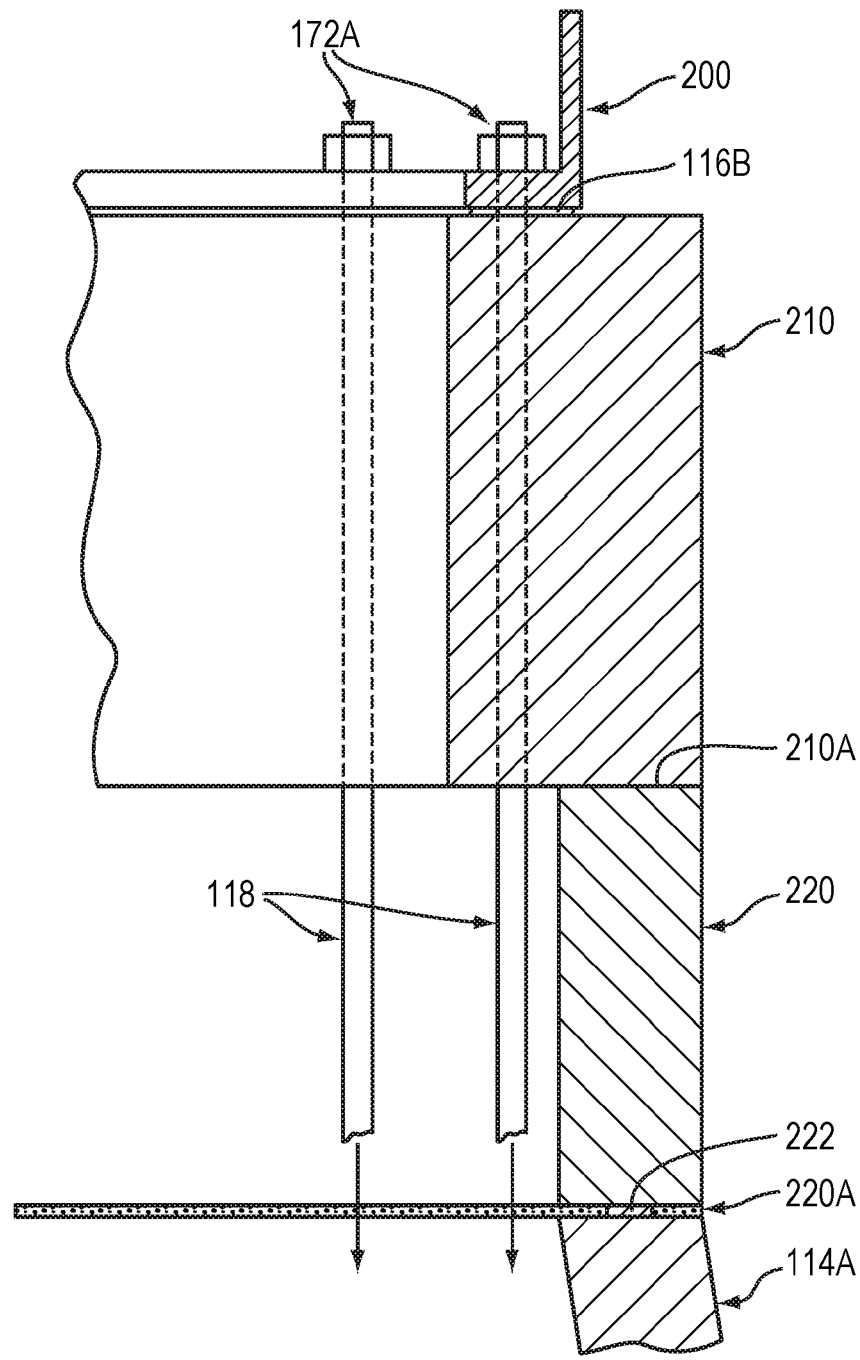
FIGS. 21 and 22 show alternative embodiments of a horizontal joint between a top-most stave and the tower top included in the present invention.

FIG. 21 shows an embodiment of the transition from the staves 114 to the turbine 119. Anchors 172A secure the tops of tendons 118 to the tower top adaptor 200, which may be made of steel. There may be grout 116B in the joint between adaptor 200 and top tube element 210, which may be a pre-cast concrete element. An epoxy joint 210A may be located between tube top element 210 and second element 220. Shim 222 and grout 220A may be located between second element 220 and the top of top stave 114A.

In addition, alternative embodiments can include multiple elements 220 between top tube element 210 and stave 114, or no elements 220 between top tube element 210 and stave 114 (stave 114 directly connected with top tube element 210). All of these modifications are within the scope of the present invention.

Figure 22:
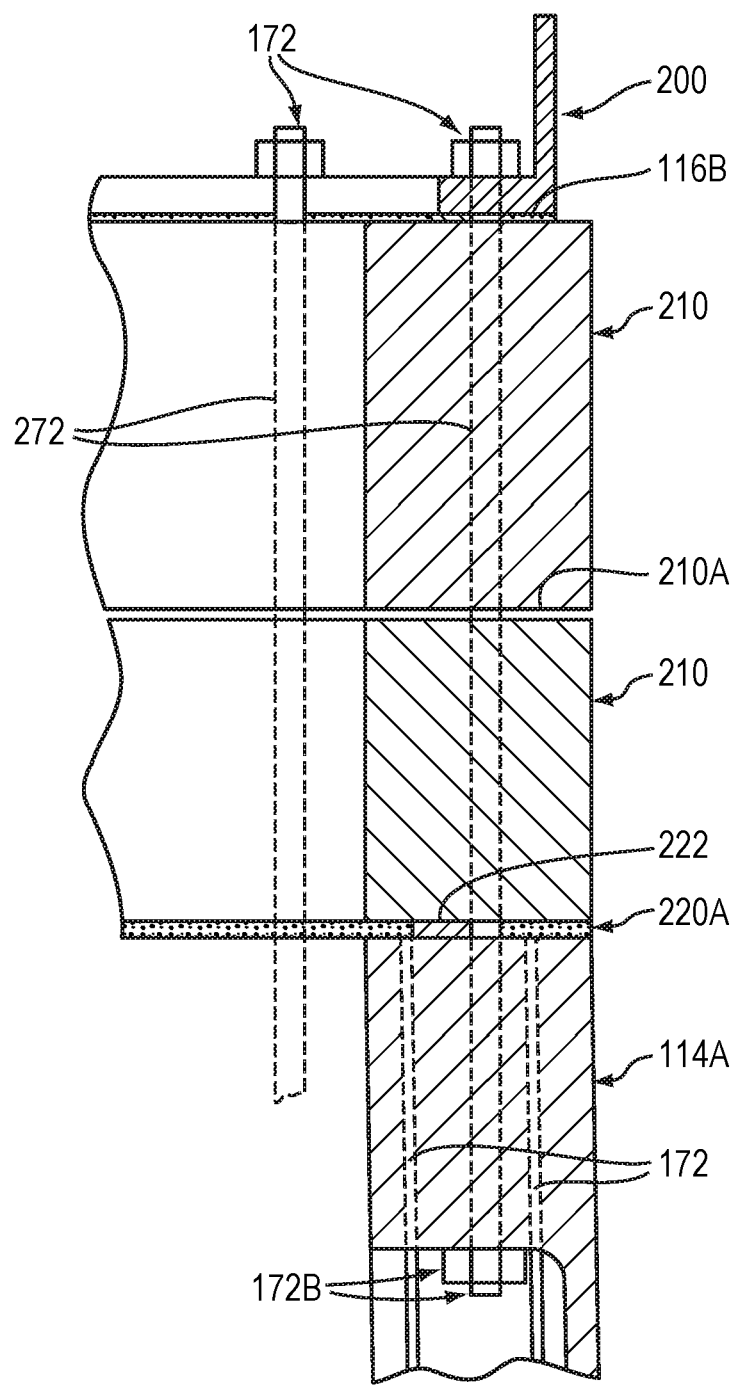

An alternative embodiment of the tower top is shown in FIG. 22. Here, post tension bolts 272 run from the top of stave 114A. through elements 210 and 220, and are capped off by nuts 172 above adaptor 200. Thus, loads from pre-stress tendons 180 in stave 114A are transferred to adaptor 200 through post-tension rod 172.

Figure 23:
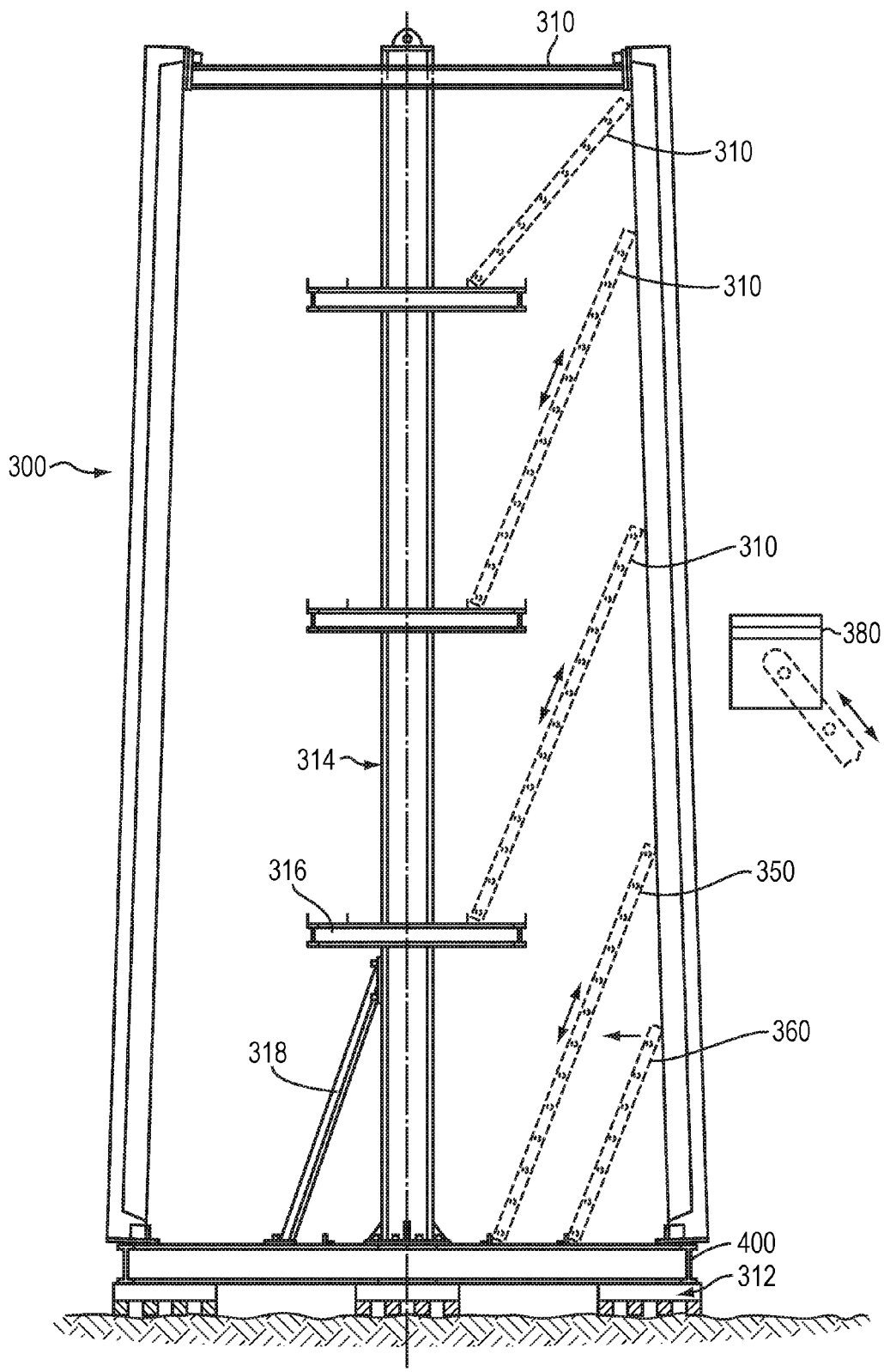
FIGS. 23 and 24 show a pre-assembly method for one level of the stacked stave tower.
Figure 24:
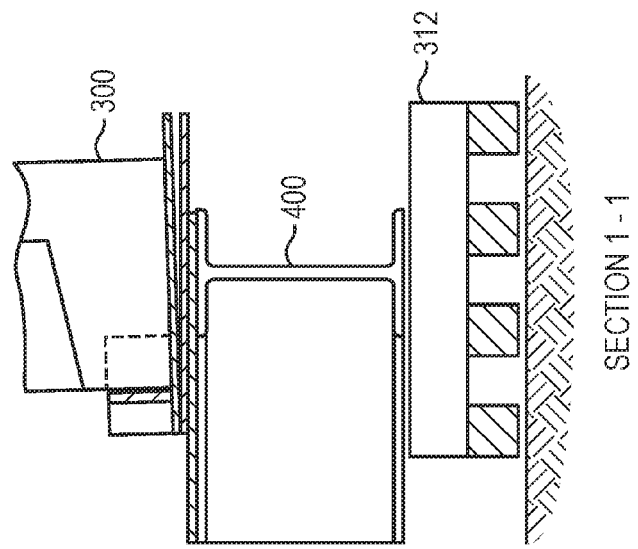
Figure 24:
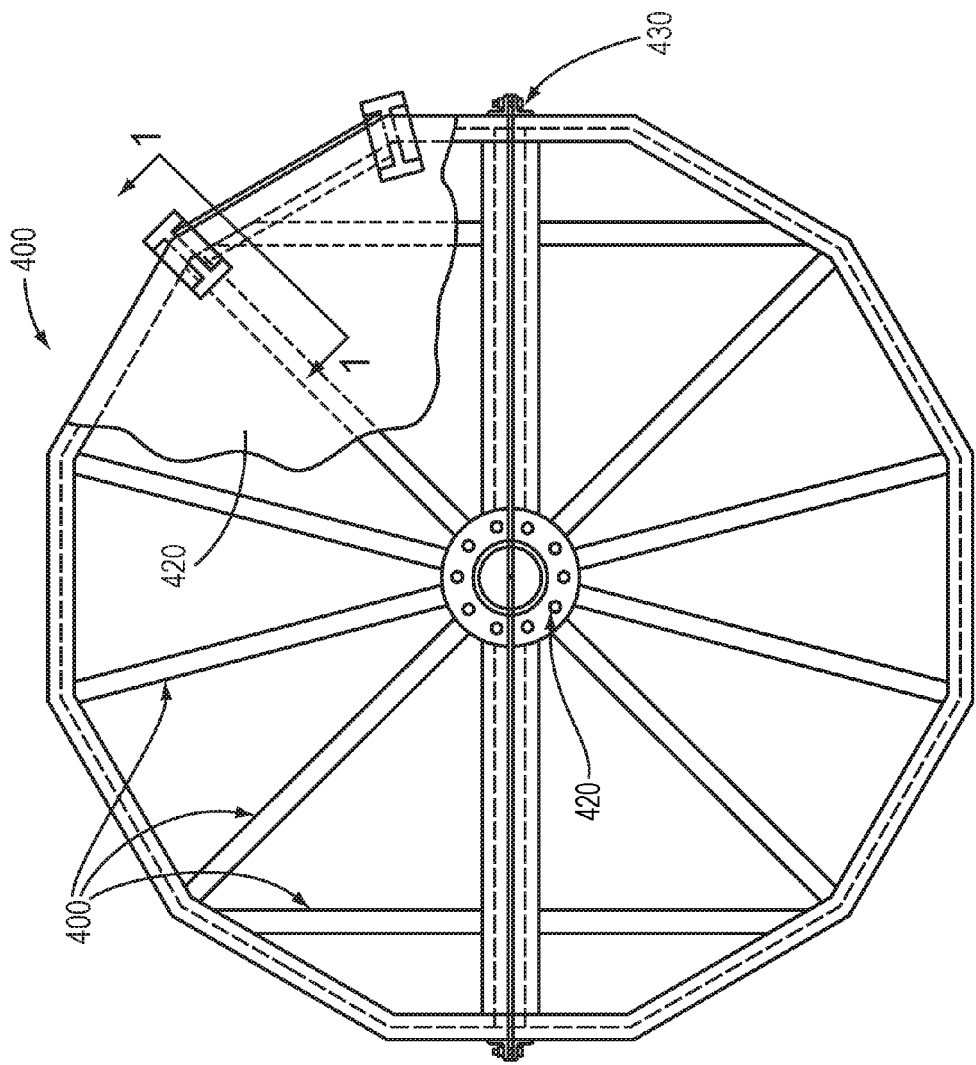

FIGS. 23 and 24 show a pre-assembly method for one level of the stacked stave tower. In one embodiment, the first level of staves is assembled on the foundation as discussed above. Then higher levels may be assembled as shown in FIGS. 23 and 24 and then lifted as a completed level onto the tower. Tower section 300 includes 1 level of staves assembled on frame 400 (shown in FIG. 24), which is placed on cribbing grade 312. Wall pipe 314 runs through a center of the tower to support platforms 316. Brace 318 supports pipe 314. Platforms 316 allow for ladder placements 310, which in addition to ladder placements 350 and 360, allow workers to place and remove the inner mold form wall for the joints shown in FIG. 19. The outer mold form walls can be easily placed and removed from the outside using a lift 380.

As shown in FIG. 24, frame 400 includes members 410, dock 420, anchor bolts 420 and base bolt 430 for disassembling the sections for shipping.

Figure 25:
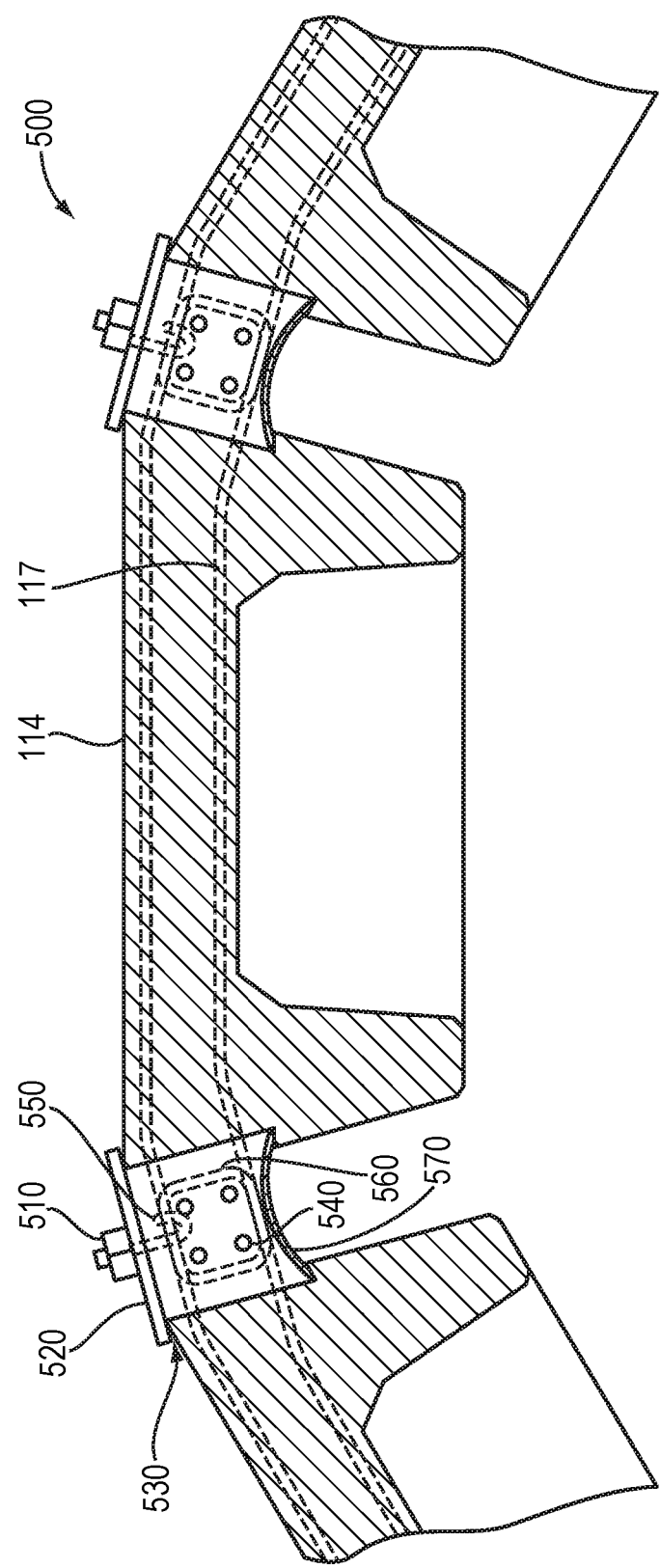

FIG. 25 shows an alternative embodiment 500 of the joints shown in FIG. 19. In this case, the front (520) and rear (570) of the mold forms stay in place after the field pour. Mold from 520 includes a hole for J-bolt 550 to pass through, which is held in place by nut 510. Gasket 530 is located between mold front 520 and the staves to keep a tight seal for the cement. Reinforcement bars 560 are an extension of pre-cast reinforcement bars 117 of the staves 114. Vertical reinforcement bars 540 are added to the joint before the concrete is poured.

Figure 26:
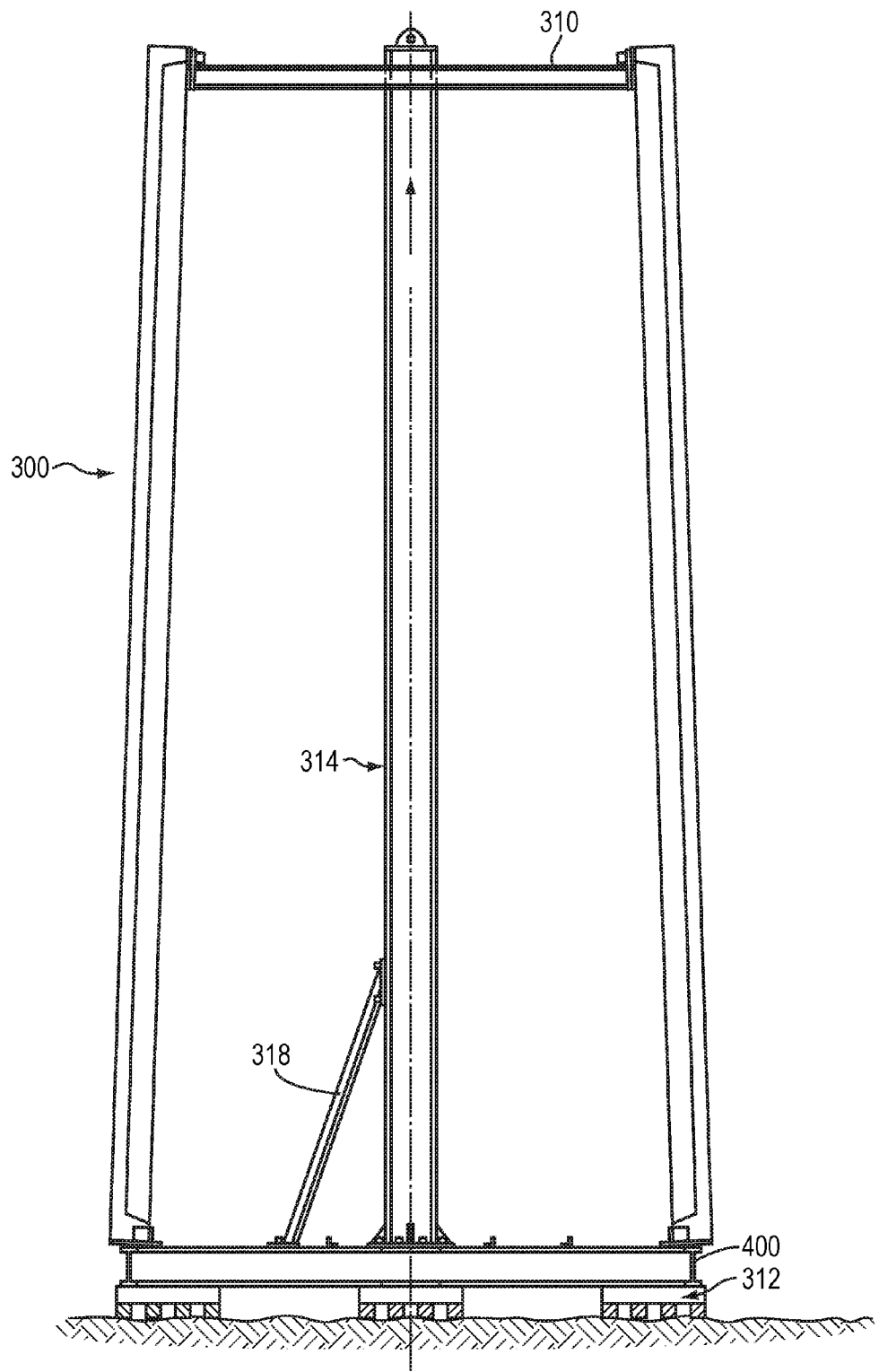
FIGS. 26-28 illustrate an alternative embodiment of the pre-assembly method shown in FIGS. 23 and 24 for one level of the stacked stave tower.
Figure 27:
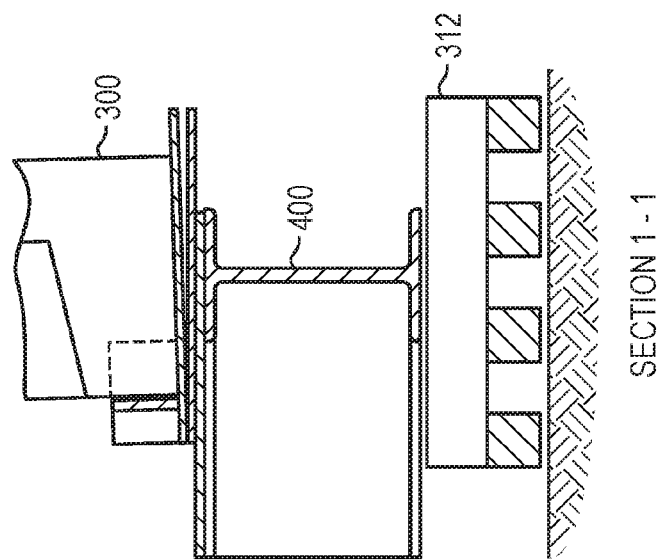
Figure 27:
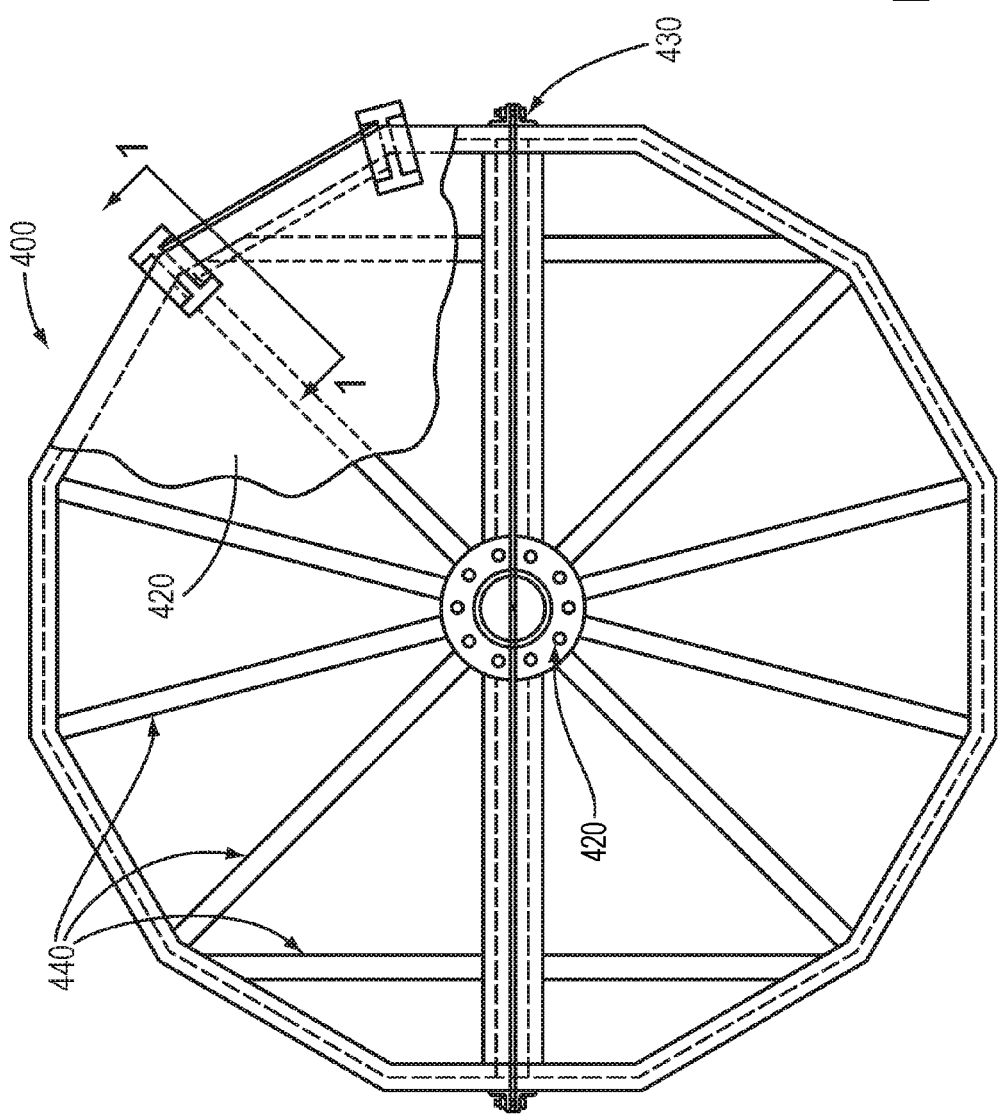
Figure 28:
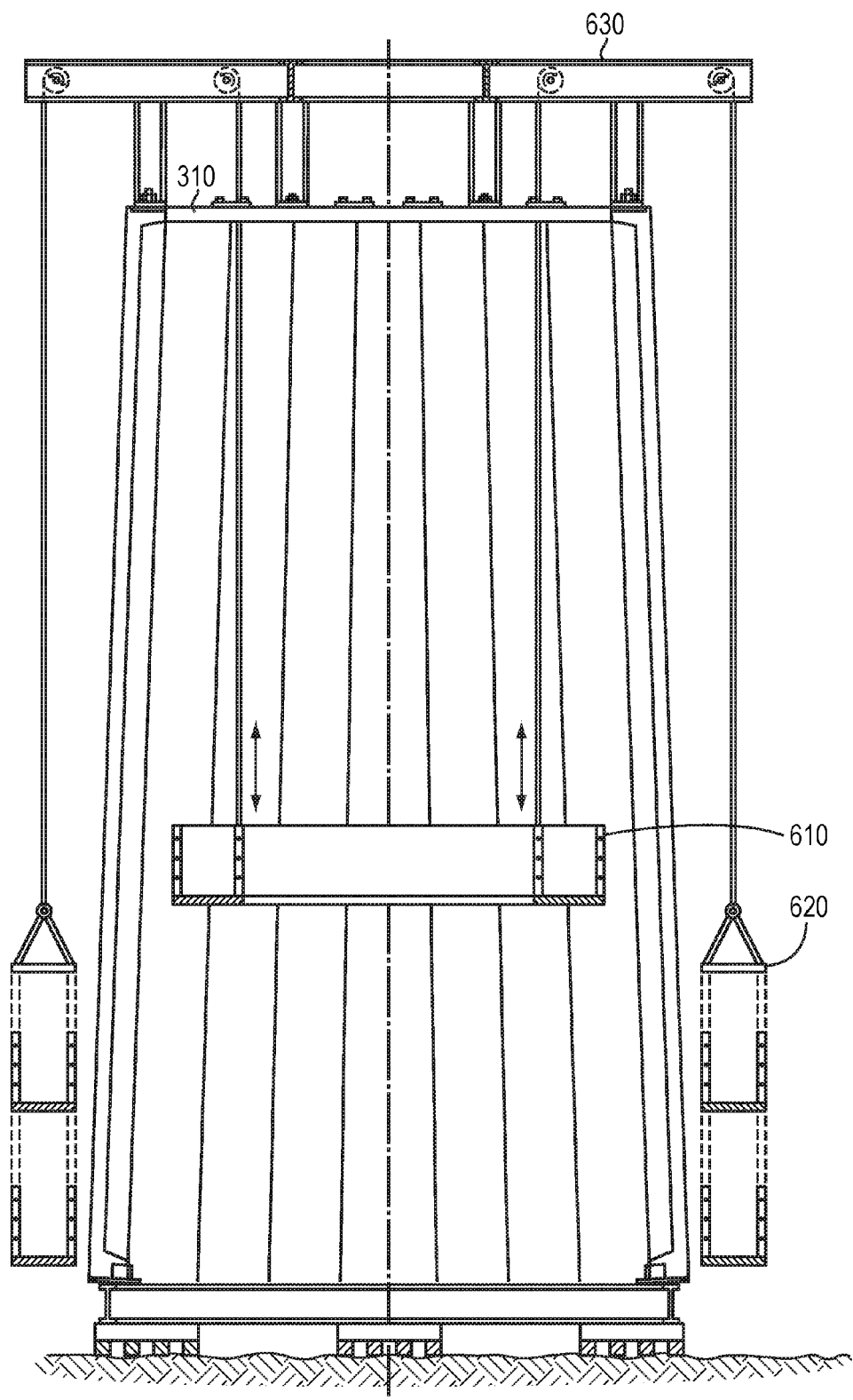

FIG. 26-28 show an alternative assembly method using scaffolding. In a similar manner as shown in FIGS. 23 and 24, tower section 300 is assembled on frame 400 (shown in FIG. 27), which is placed on cribbing grade 312. However, as shown in FIG. 28, scaffolding system 600 is used to place and remove the mold forms for the vertical joints between staves. System 600 is all supported by frame 630, which is connected to work platform 310 and the tops of the staves. Inner scaffolding 610 can be moved up and down within the tower section 300, and outer scaffolding 620 is moved up and down outside of tower section 300. When tower section 300 is complete, it is then lifted onto the tower to continue the erection process.

The present written description uses examples to disclose the present subject matter, including the best mode, and also to enable any person skilled in the art to practice the present subject matter, including making and using any devices or systems and performing any incorporated and or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. An apparatus comprising:
a foundation;
a plurality of lower staves boated on the foundation;
a plurality of upper staves located above the lower staves, the upper staves having a poured in place concrete or grouted joint between each adjacent upper stave, and
a shim placed in a joint between one of the plurality of upper staves and one of the plurality of lover staves and surrounded by grout;
wherein each of the lower staves and upper staves comprises at least one seat that extends from an inner surface of the respective stave in a direction transverse to the inner surface, the seat defining a horizontal duct, each seat having a width that is less than a width of the respective stave from which the seat extends as measured in a plane that extends through the seat and stave, and the apparatus further comprises one or more horizontal post-tensioning tendons, wherein a respective horizontal post-tensioning tendon extends through the ducts of staves in a respective stave course and extends and is exposed between two adjacent seats.

2. An apparatus comprising:
a foundation;
a plurality of lower staves located on the foundation; and
a plurality of upper staves located above the lower staves,
a first upper stave connected to a first lower stave by a rod extending through a passage defined in each of the first upper stave and the first lower stave,
wherein each of the lower staves and upper staves comprises at least one seat that extends from an inner surface of the respective stave in a direction transverse to the inner surface, the seat defining a horizontal duct, each seat having a width that is less than a width of the respective stave from which the seat extends as measured in a plane that extends through the seat and stave, and the apparatus further comprises one or more horizontal post-tensioning tendons, wherein a respective horizontal post-tensioning tendon extends through the ducts of staves in a respective stave course and extends and is exposed between two adjacent seats.

3. The apparatus according to claim 2, wherein each of the first upper stave and the first lower stave include pre-stress tendons that extend along a length of each stave.

4. The apparatus according to claim 2, further comprising:
a shim placed in a joint between one of the plurality of upper stave and one of the plurality of lower staves surrounded by grout.

5. The apparatus according to claim 2, wherein there is a gap between tops of each of the plurality of upper staves, and each gap contains rebar and grout.

6. An apparatus comprising:
a foundation;
a plurality of lower staves located on the foundation;
a plurality of upper staves located above the lower staves, the upper staves having a poured in place concrete or grouted joint between each adjacent upper stave, wherein each upper stave has a bottom surface that is wider than a top surface thereof;
a second element disposed on the top surfaces of the plurality of upper staves;
a tube top element disposed on a top surface of the second element; and
a tower top adaptor disposed on a top surface of the tube top element,
wherein at least one tendon extends from the foundation to the tower top adaptor and passes through a passage defined in the tube top element and does not extend through the second element.

7. The apparatus according to claim 6, further comprising:
a tendon anchor located in the foundation.

8. The apparatus according to claim 6, wherein the tower top adaptor is made of steel and the apparatus supports a wind turbine.

9. The apparatus according to claim 6, further comprising:
a wherein each of the lower staves and upper staves comprises at least one seat that extends from an inner surface of the respective stave in a direction transverse to the inner surface, the seat defining a horizontal duct, each seat having a width that is less than a width of the respective stave as measured in a plane that extends through the seat and stave, and the apparatus further comprises one or more horizontal post-tensioning tendons, wherein a respective horizontal post-tensioning tendon extends through the ducts of staves in a respective stave course and extends and is exposed between two adjacent seats.

10. An apparatus comprising:
a foundation;
a plurality of lower staves located on the foundation; and
a plurality of upper staves located above the lower staves,
a first upper stave connected to a first lower stave by a rod extending through a passage defined in each of the first upper stave and the first lower stave, wherein each upper stave has a bottom surface that is wider than a top surface thereof;

a second element disposed on the top surfaces of the plurality of upper staves;

a tube top element disposed on a top surface of the second element; and a tower top adaptor disposed on a top surface of the tube top element, wherein at least one tendon extends from the foundation to the tower top adaptor and passes through a passage defined in the tube top element and does not extend through the second element.

11. The apparatus according to claim 10, further comprising:

a tendon anchor located in the foundation.

12. The apparatus according to claim 10, wherein the tower top adaptor is made of steel and supports a wind turbine.

13. The apparatus according to claim 10 wherein each of the lower staves and upper staves comprises at least one seat that extends from an inner surface of the respective stave in a direction transverse to the inner surface, the seat defining a horizontal duct, each seat having a width that is less than a width of the respective stave as measured in a plane that extends through the seat and stave, and the apparatus further comprises one or more horizontal post-tensioning tendons, wherein a respective horizontal post-tensioning tendon extends through the ducts of staves in a respective stave course and extends and is exposed between two adjacent seats.

* * * * *

UNITED STATES PATENT AND TRADEMARK OFFICE
CERTIFICATE OF CORRECTION

PATENT NO. : 10,138,648 B2
APPLICATION NO. : 14/992297
DATED : November 27, 2018
INVENTOR(S) : Bryant A Zavitz et al.

Page 1 of 1

It is certified that error appears in the above-identified patent and that said Letters Patent is hereby corrected as shown below:

In the Claims

In Claim 1 at Column 7, Line 46, the term "boated" should read --located--.

In Claim 1 at Column 7, Line 51, the term "lover" should read --lower--.

Signed and Sealed this
Fifth Day of March, 2019

Andrei Iancu
*Director of the United States Patent and Trademark Office*